(12) United States Patent
Hui

(10) Patent No.: US 12,513,109 B2
(45) Date of Patent: Dec. 30, 2025

(54) IPV6 ADDRESS CONFIGURATION METHOD AND ROUTING DEVICE

(71) Applicant: Huawei Technologies Co., Ltd., Shenzhen (CN)

(72) Inventor: Shaobo Hui, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 18/270,333

(22) PCT Filed: Dec. 14, 2021

(86) PCT No.: PCT/CN2021/138051
§ 371 (c)(1),
(2) Date: Jun. 29, 2023

(87) PCT Pub. No.: WO2022/143161
PCT Pub. Date: Jul. 7, 2022

(65) Prior Publication Data
US 2024/0106795 A1 Mar. 28, 2024

(30) Foreign Application Priority Data
Dec. 31, 2020 (CN) .......................... 202011626372.7

(51) Int. Cl.
*H04L 61/5007* (2022.01)
*H04L 101/659* (2022.01)

(52) U.S. Cl.
CPC .... *H04L 61/5007* (2022.05); *H04L 2101/659* (2022.05)

(58) Field of Classification Search
None
See application file for complete search history.

(56) References Cited

U.S. PATENT DOCUMENTS

| 8,681,695 | B1 | 3/2014 | Krishnan |
| 2013/0089097 | A1* | 4/2013 | Filsfils ................ H04L 45/741 370/393 |
| 2017/0134274 | A1 | 5/2017 | Araújo |
| 2020/0127970 | A1* | 4/2020 | Grundemann ...... H04L 61/5014 |

FOREIGN PATENT DOCUMENTS

| CN | 102801826 B | 11/2014 |
| CN | 106331191 A | 1/2017 |
| WO | 2020042899 A1 | 3/2020 |

* cited by examiner

*Primary Examiner* — William G Trost, IV
*Assistant Examiner* — Christopher P Cadorna
(74) *Attorney, Agent, or Firm* — Slater Matsil, LLP

(57) ABSTRACT

In accordance with an embodiment method, a routing device obtains a plurality of IPv6 prefixes from a plurality of networks; determines a first IPv6 prefix from the plurality of IPv6 prefixes according to a first routing policy, and allocates the first IPv6 prefix to a terminal device; receives a first data service request including a first IPv6 address from the terminal device; determines, according to a second routing policy; determines a second IPv6 address based on the first IPv6 address and a second IPv6 prefix corresponding to the second network; and sends a second data service request including the second IPv6 address to the second network, where the first IPv6 address is determined by the terminal device based on the first IPv6 prefix and a local address, and the second network is any network other than the first network in the plurality of networks.

20 Claims, 10 Drawing Sheets

IPV6 ADDRESS CONFIGURATION METHOD AND ROUTING DEVICE

CROSS-REFERENCE TO RELATED APPLICATIONS

This application is a national stage of International Application No. PCT/CN2021/138051, filed on Dec. 14, 2021, which claims priority to Chinese Patent Application No. 202011626372.7 filed on Dec. 31, 2020. Both of the aforementioned applications are hereby incorporated by reference in their entireties.

TECHNICAL FIELD

This application relates to the field of communication technologies, and in particular, to an Internet protocol version 6 (Internet protocol version 6, IPv6) address configuration method and a routing device.

BACKGROUND

Due to service reliability and bandwidth superposition requirements, a routing device, for example, customer-premises equipment (customer-premises equipment, CPE), needs to support a dual-mode dual-standby capability. For example, the routing device may support dual uplink connections to a fixed network (fixed network for short) and a mobile network. Further, the routing device provides dual uplinks for selection by a terminal device connected to the routing device. This improves a service bandwidth and connection reliability.

Currently, an Internet protocol version 4 (Internet protocol version 4, IPv4) address is usually used to implement service data transmission in the foregoing scenario in which the routing device supports the dual uplink connections. Because of a shortage of IPv4 addresses, it is proposed that IPv6 addresses can be used instead of IPv4 addresses. An IPv6 address includes 128 bits. Generally, the first 64 bits are a prefix (prefix), and the last 64 bits are a local address.

Specifically, in an IPv6 address allocation process, after the routing device is powered on and connected to a network, a connected network side allocates an IPv6 prefix to the routing device, and a local address is determined based on a local media access control (media access control, MAC) address. An IPv6 address includes the IPv6 prefix and the local address. The IPv6 address is an IPv6 address allocated by the network side to the routing device. In a scenario in which the routing device supports dual-mode dual-standby, different IPv6 prefixes are allocated by different networks. However, when the routing device communicates with the different networks by using an IPv6 address, the terminal device may fail to connect to and communicate with the network, resulting in a service failure. Consequently, it is not flexible to implement a service by using an IPv6 address in a current dual connectivity scenario of the routing device.

SUMMARY

This application provides an IPv6 address configuration method and a routing device, to manage an IPv6 address of a terminal device connected to a routing device, so that communication between the terminal device and a plurality of networks supported by the routing device can be implemented.

According to a first aspect, this application provides an IPv6 address configuration method. The method may include: A routing device obtains a plurality of IPv6 prefixes from a plurality of networks; the routing device determines a first IPv6 prefix from the plurality of IPv6 prefixes according to a first routing policy, and allocates the first IPv6 prefix to a terminal device connected to the routing device; the routing device receives a first data service request from the terminal device, where the first data service request includes a first IPv6 address of the terminal device, and the first IPv6 address is determined by the terminal device based on the first IPv6 prefix and a local address of the terminal device; the routing device determines, according to a second routing policy, that the first data service request corresponds to a second network; the routing device determines a second IPv6 address based on the first IPv6 address and a second IPv6 prefix corresponding to the second network; and the routing device sends a second data service request to the second network, where the second data service request includes the second IPv6 address, the plurality of IPv6 prefixes are in one-to-one correspondence with the plurality of networks, the first IPv6 prefix corresponds to a first network, and the second network is any network other than the first network in the plurality of networks.

According to the foregoing method, the terminal device can generate a unique IPv6 address, and when an IPv6 prefix of a network corresponding to a service requested based on the IPv6 prefix of the terminal device is inconsistent, the routing device generates a new address for an address of the terminal device and the IPv6 prefix of the network, so that communication between the terminal device and the network is implemented, and communication between the terminal device and the plurality of networks supported by the routing device can be implemented, that is, the terminal device can access networks with different IPv6 prefixes.

In a possible design, the first routing policy maybe determining an IPv6 prefix corresponding to a network with a highest load capability in the plurality of networks as the first IPv6 prefix. In this way, the routing device determines, from the plurality of IPv6 prefixes, the IPv6 prefix corresponding to the network with the highest load capability as a finally determined IPv6 prefix, so that translation of the address of the terminal device by the routing device can be reduced, thereby improving forwarding performance.

In a possible design, the second routing policy is determining, based on a correspondence between a predetermined service and a network connection or a correspondence between a terminal device and a network connection, a network corresponding to a data service request. In this way, a network that needs to be accessed by the terminal device can be successfully determined, so that the data service request of the terminal device is accurately sent to the corresponding network.

In a possible design, the routing device uses the first IPv6 prefix as an IPv6 prefix of the routing device; and determines an IPv6 address of the routing device based on the first IPv6 prefix and a local address of the routing device. In this way, in a multi-connectivity scenario, the routing device can have a unique IPv6 address to ensure a unique communication address.

In a possible design, a specific method for determining, by the routing device, the second IPv6 address based on the first IPv6 address and the second IPv6 prefix corresponding to the second network may be: The routing device replaces the first IPv6 prefix in the first IPv6 address with the second IPv6 prefix, to obtain the second IPv6 address. In this way, the routing device can accurately obtain the second IPv6 address corresponding to the second network, so that the data service request of the terminal device is successfully sent to the accessed network.

In a possible design, before the routing device receives the first data service request from the terminal device, the routing device may further receive a first neighbor solicitation broadcast message from the terminal device, where the first neighbor solicitation broadcast message includes the first IPv6 address; the routing device replaces the first IPv6 prefix in the first IPv6 address with the second IPv6 prefix, to obtain a second neighbor solicitation broadcast message including the second IPv6 address; and the routing device sends the second neighbor solicitation broadcast message to the second network, where the second neighbor solicitation broadcast message requests the second network to perform conflict detection on the second IPv6 address. In this way, a conflict of the IPv6 address of the terminal device in the second network can be avoided.

In a possible design, before the routing device receives the first data service request from the terminal device, the routing device further sends the first neighbor solicitation broadcast message to the first network based on the first IPv6 address, where the first neighbor solicitation broadcast message requests the first network to perform conflict detection on the first IPv6 address. In this way, a conflict of the IPv6 address of the terminal device in the first network can be avoided.

In a possible design, the routing device receives a third data service request from the terminal device, where the third data service request includes the first IPv6 address; the routing device determines, according to the second routing policy, that the third data service request corresponds to the first network; and the routing device forwards the third data service request to the first network based on the first IPv6 address. In this way, the routing device can accurately send the data service request, corresponding to the first network, of the terminal device, to the first network.

In a possible design, the routing device receives a fourth data service request from the second network, where the fourth data service request includes the second IPv6 address; the routing device replaces the second IPv6 prefix in the second IPv6 address with the first IPv6 prefix, to generate the first IPv6 address; and the routing device sends a fifth data service request to the terminal device, where the fifth data service request includes the first IPv6 address. In this way, communication between a network with an IPv6 prefix different from that of the terminal device and the terminal device can be implemented, that is, the network with the IPv6 prefix different from that of the terminal device can access the terminal device.

In a possible design, the routing device receives a sixth data service request from the first network, where the sixth data service request includes the first IPv6 address; and the routing device forwards the sixth data service request to the terminal device based on the first IPv6 address. In this way, the terminal device can access the network.

According to a second aspect, this application provides a routing device. The routing device has a function of implementing the routing device in the first aspect or the possible design examples of the first aspect. The function may be implemented by hardware, or may be implemented by hardware by executing corresponding software. The hardware or the software includes one or more modules corresponding to the foregoing function.

In a possible design, a structure of the routing device may include a transceiver module and a processing module. These modules may perform corresponding functions of the routing device in the first aspect or the possible design examples of the first aspect. For details, refer to detailed descriptions in the method examples. Details are not described herein again. Optionally, the transceiver module may include but is not limited to a modem. The processing module may include, but is not limited to, a prefix policy module and a routing module.

In a possible design, a structure of the routing device may include a communication interface and a processor, and optionally, may further include a memory. The communication interface may be configured to send and receive a message or data, and is configured to communicate and interact with another device in a communication system. The processor is configured to support the routing device in performing a corresponding function of the routing device in the first aspect or the possible design examples of the first aspect. The memory is coupled to the processor, and stores program instructions and data that are necessary for the routing device.

According to a third aspect, this application provides a communication system. The communication system may include the terminal device, the routing device, and the plurality of networks mentioned above.

According to a fourth aspect, this application provides a computer-readable storage medium. The computer-readable storage medium stores program instructions. When the program instructions are run on a computer, the computer is enabled to perform any one of the first aspect and the possible designs of the first aspect. For example, the computer-readable storage medium may be any usable medium accessible to the computer. By way of example and not limitation, the computer-readable medium may include a non-transient computer-readable medium, a random access memory (random access memory, RAM), a read-only memory (read-only memory, ROM), an electrically erasable programmable read-only memory (electrically EPROM, EEPROM), a CD-ROM or another optical disc storage, a magnetic disk storage medium or another magnetic storage device, or any other medium that can be used to carry or store expected program code in a form of an instruction or a data structure and can be accessed by the computer.

According to a fifth aspect, an embodiment of this application provides a computer program product including computer program code or instructions. When the computer program product runs on a computer, the computer is enabled to implement the method according to any one of the first aspect or the possible designs of the first aspect.

According to a sixth aspect, this application further provides a chip. The chip is coupled to a memory, and is configured to read and execute program instructions stored in the memory, to implement the method according to any one of the first aspect or the possible designs of the first aspect.

For each of the second aspect to the sixth aspect and technical effects that may be achieved by the aspect, refer to the descriptions of technical effects that may be achieved by each possible solution in the first aspect. Details are not described herein again.

DETAILED DESCRIPTION OF ILLUSTRATIVE EMBODIMENTS

The following further describes in detail this application with reference to accompanying drawings.

Embodiments of this application provide an IPv6 address configuration method and a routing device, to manage an IPv6 address of a terminal device connected to a routing device, so that communication between the terminal device and a plurality of networks supported by the routing device can be implemented. The method and an apparatus (namely, the routing device) in this application are based on a same technical concept. Because problem-resolving principles of the method and the apparatus are similar, mutual reference may be made to implementations of the apparatus and the method, and repeated parts are not described again.

In the following, some terms in this application are described, to help a person skilled in the art have a better understanding.

(1) A routing device in embodiments of this application may allocate an IPv6 prefix or an IPv6 address to a terminal device, and route service data between the terminal device and a network. For example, the routing device may be, but is not limited to, CPE, a router, a wireless switch, a wireless local area network (wireless fidelity, Wi-Fi) wireless router, an optical network terminal, a Wi-Fi wireless repeater, or a portable terminal hotspot.

(2) The terminal device in embodiments of this application maybe but is not limited to a station (station, STA), a mobile phone, a notebook computer, a tablet computer, a vehicle-mounted computer, a personal digital assistant (personal digital assistant, PDA), a smartwatch, a personal computer (personal computer, PC), a laptop computer (Laptop), or the like.

It should be understood that, in this application, "/" means "or" unless otherwise specified. For example, A/B may represent A or B. In this application, "and/or" describes only an association relationship between associated objects and represents that three relationships may exist. For example, A and/or B may represent the following three cases: Only A exists, both A and B exist, and only B exists. "At least one" means one or more, and "a plurality of" means two or more.

In this application, "example", "in an optional implementation", "in another optional implementation", or the like is used as an example, an illustration, or a description. Any embodiment or design scheme described as an "example" in this application should not be explained as being more preferred or having more advantages than another embodiment or design scheme. Specifically, the term "example" is used to present a concept in a specific manner.

In addition, terms such as "first" and "second" in this application are merely used for distinction and description, and cannot be understood as an indication or implication of relative importance or an implicit indication of a quantity of indicated technical features, or an indication or implication of a sequence.

Figure 1:
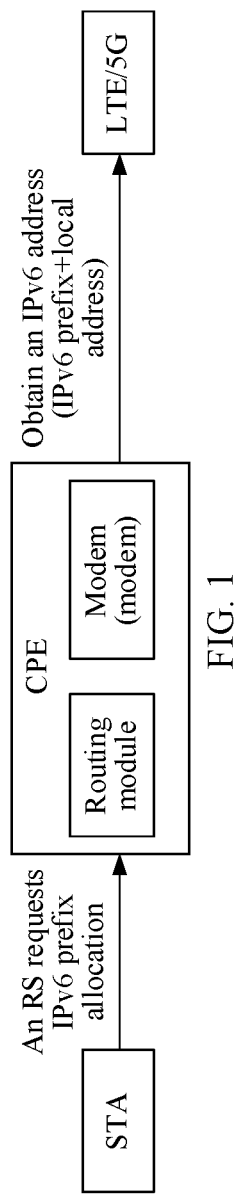
FIG. 1 is a schematic diagram of an IPv6 address allocation process of a routing device according to this application.

In some embodiments, a process in which a routing device allocates an IPv6 address may be shown in FIG. 1. In FIG. 1, the routing device is CPE, and a terminal device is a STA. Specifically, after the CPE is powered on and connected to an LTE or 5G network, a network side allocates an IPv6 prefix to the CPE, and the CPE calculates a local IPv6 address based on a local media access control (media access control, MAC) address, to form a unique IPv6 address. The IPv6 address is an IPv6 address allocated by the network side to the CPE. After the STA accesses the CPE through a wireless local area network (wireless fidelity, Wi-Fi), the STA initiates a router request (router solicitation, RS) to the CPE, where the RS requests to allocate an IPv6 prefix, and the CPE returns an IPv6 prefix of the CPE to the STA by using a router advertisement (router advertisement, RA) message. The STA generates an IPv6 address of the STA based on the IPv6 prefix and a local address.

Because IPv6 addresses generated based on a same address prefix may be duplicate, before starting to generate the IPv6 address, the CPE or the STA needs to request, by using a neighbor solicitation (neighbor solicitation, NS), the network to perform address conflict detection (duplicate address detection, DAD) on the IPv6 address, and determine, depending on whether an neighbor advertisement (neighbor advertisement, NA) message is received, whether the IPv6 address has a conflict (where if the NA message is received, it indicates that there is a conflict; or if no NA message is received within a period of time, it indicates that there is no conflict), to ensure that the IPv6 address can be enabled only when the address has no conflict in a prefix domain.

Figure 2:
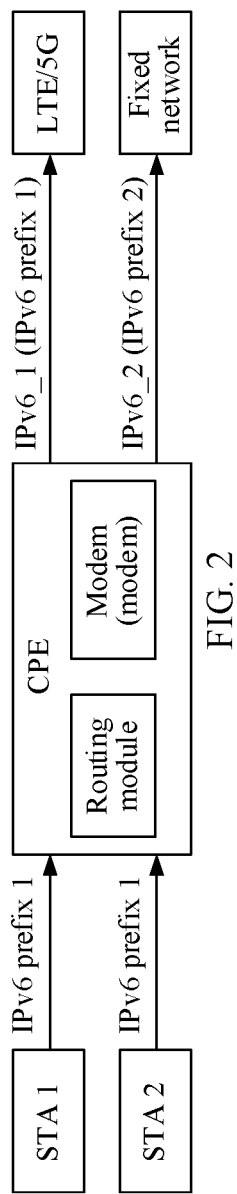
FIG. 2 is a schematic diagram of a networking status according to this application.

Further, when the CPE establishes a second uplink IPv6 connection to a fixed network (or a second LTE or 5G network connection) on the basis that the CPE has established an uplink connection to the LTE or 5G network, a specific networking status may be shown in FIG. 2.

The CPE first establishes an IPv6 connection to the LTE/5G network. In this case, the CPE obtains an IPv6 prefix 1 and allocates the IPv6 prefix 1 to a STA 1 and a STA 2. IPv6 addresses of the CPE, the STA 1, and the STA 2 are generated based on the IPv6 prefix 1. When the CPE establishes the second IPv6 connection to the fixed network, the fixed network allocates an IPv6 prefix 2 to the CPE. In this case, prefixes in the IPv6 addresses of the CPE, the STA 1, and the STA 2 are still the IPv6 prefix 1. When the STA 1 and the STA 2 are connected to the fixed network according to a routing rule (for example, the LTE/5G connection is interrupted) through routing of the CPE, because the IPv6 prefix 1 of the STA 1 and the STA 2 is inconsistent with the IPv6 prefix 2 of the fixed network, the STA 1 and the STA 2 cannot communicate with the fixed network. According to the IPv6 protocol, when a STA accesses a network, a carried source address prefix needs to be the same as a prefix of the network. If the prefixes are different, a request is rejected and a service cannot be used. As a result, the CPE cannot flexibly use an IPv6 address to implement the service.

In view of the foregoing problem, this application provides an IPv6 address management method, to manage an IPv6 address of a terminal device connected to a routing device, so that communication between the terminal device and a plurality of networks supported by the routing device can be implemented.

Figure 3:
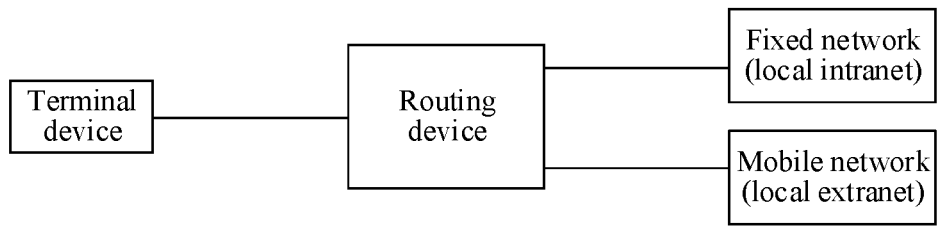
FIG. 3 is a schematic diagram of a scenario according to this application.
Figure 4:
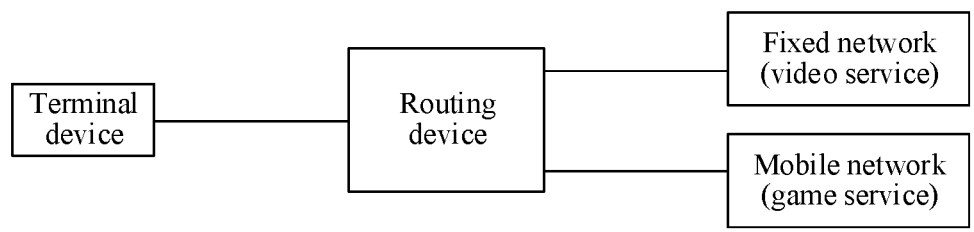
FIG. 4 is a schematic diagram of another scenario according to this application.
Figure 5:
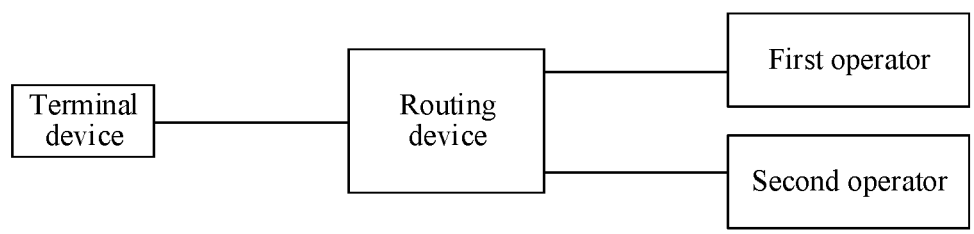
FIG. 5 is a schematic diagram of another scenario according to this application.

The IPv6 address management method provided in embodiments of this application is applicable to the following scenarios: (1) There is a scenario in which an intranet and an extranet need to be isolated, as shown in FIG. 3. For example, a doctor in a hospital uses a hospital fixed network, that is, a local intranet, to view a historical case of a patient in the hospital, and the doctor accesses a mobile network (for example, a fifth generation (fifth generation, 5G) network or a long term evolution (long term evolution, LTE) network), that is, an extranet, to access news displayed on a web page. (2) There is a scenario in which some services need to be implemented by connecting to a fixed network, and other services can be implemented by connecting to a mobile network, as shown in FIG. 4. For example, in some areas, video services need to be implemented by using fixed networks, and game services need to be implemented by using mobile networks. (3) There is a scenario in which for network reliability, mobile networks provided by at least two operators are used, as shown in FIG. 5. For example, in a live broadcast process performed by using a terminal device, a video recording service may be performed by using a mobile network provided by a first operator, and a text message sending and receiving service may be performed by using a mobile network provided by a second operator. It should be understood that the foregoing listed three scenarios are merely examples, and the method provided in embodiments of this application may be further applied to another scenario in which a routing device supports dual network connections or a plurality of network connections. Examples are not listed one by one in this application. It should be noted that in this application, the dual network connections may be connections of the routing device to a fixed network and a mobile network, or maybe connections of the routing device to two same or different mobile networks; and the plurality of network connections may be a plurality of network connections of the routing device to a fixed network and a mobile network, or may be connections of the routing device to a plurality of mobile networks. This is not limited in this application.

Figure 6:
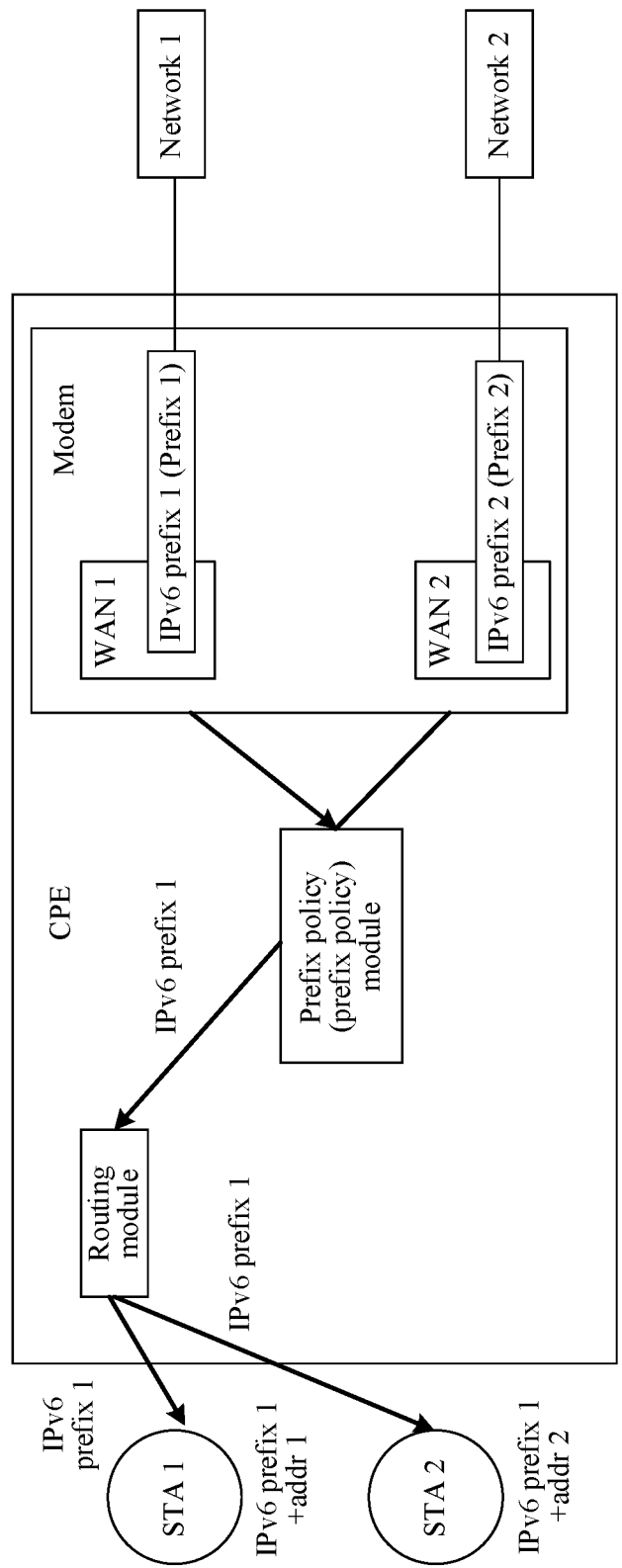
FIG. 6 is a schematic diagram of another scenario according to this application.

A scenario to which the IPv6 address management method provided in embodiments of this application is applicable may include at least one terminal device, a routing device, and at least one network. For example, FIG. 6 is a schematic diagram of an example scenario to which the IPv6 address management method provided in embodiments of this application is applicable. In FIG. 6, for example, a terminal device is a STA, and a routing device is CPE. The schematic scenario diagram shown in FIG. 6 may include two STAs (for example, a STA 1 and a STA 2), CPE, and two networks (for example, a network 1 and a network 2). Both the STA 1 and the STA 2 need to connect to the network 1 and/or the network 2 through the CPE to perform a service. Details are as follows:

The network 1 and the network 2 may be different networks. For example, the network 1 and the network 2 are respectively a fixed network and a mobile network. For another example, the network 1 and the network 2 are different mobile networks, or the network 1 and the network 2 may be a same mobile network. For example, the mobile network may be a 5G network or an LTE network; and the fixed network may be a fixed telecommunication network, which is referred to as a "fixed network" for short, and is a telephone network that transmits a signal by using solid media such as a metal wire or an optical fiber line. An IPv6 connection 1 is established between the network 1 and the CPE, and an IPv6 connection 2 is established between the network 2 and the CPE. The network 1 may allocate an IPv6 prefix 1 to the CPE, and the network 2 may allocate an IPv6 prefix 2 to the CPE.

In this application, a prefix proxy (prefix proxy) function is added to the CPE, and the function may be implemented by using a prefix policy (prefix policy) module shown in FIG. 6. The prefix policy module may manage a relationship between an IPv6 address of a STA and a network connection, so that the STA successfully performs a service by using a corresponding network. In addition, the CPE may further include a routing module and a modem (modem) module shown in FIG. 6. For example, the routing module may be configured to implement communication between the CPE and the STA. The routing module may include, but is not limited to, a dynamic host configuration protocol version 6 (dynamic host configuration protocol version 6, DHCPv6) module and the like. The prefix policy module may allocate an IPv6 prefix to the STA 1 and the STA 2 by using the routing module. The modem module may be configured to implement communication between the CPE and the network. The CPE may establish the IPv6 connection 1 to the network 1 by using the modem module, and establish the IPv6 connection 2 to the network 2 by using the modem module. After the modem module establishes the IPv6 connection 1 to the network 1, a wide area network (wide area network, WAN) 1 is created inside the modem module, and the WAN 1 corresponds to the IPv6 connection 1. After the modem module establishes the IPv6 connection 1 to the network 1, a WAN 2 is created inside the modem module, and the WAN 2 corresponds to the IPv6 connection 2.

In an embodiment, when the CPE establishes the IPv6 connection 1 to the network 1, the CPE obtains the IPv6 prefix 1 from the network 1, and when the CPE establishes the IPv6 connection 2 to the network 2, the CPE obtains the IPv6 prefix 2 from the network 2. The CPE stores the obtained IPv6 prefix 1 and IPv6 prefix 2 in the prefix policy module for management by the prefix policy module. The prefix policy module of the CPE selects an IPv6 prefix as an IPv6 prefix of the CPE according to a first routing policy, and allocates the IPv6 prefix to the STA 1 and the STA 2 by using the routing module. The first routing policy may be using an IPv6 prefix corresponding to a network connection with a higher load capability as a default IPv6 prefix. In this application, a level of a load capability may refer to a quantity of types of load services that can be connected to the network, or a level of a load capability may refer to a quantity of load terminals that can be connected to the network, or a level of a load capability may refer to a quantity of loads that can be concurrently processed by the network, a throughput, or the like. Certainly, there may be another explanation for the level of the load capability. This is not limited in this application. For example, if the prefix policy module determines, based on a correspondence between a predetermined service and a network connection or a correspondence between a STA and a network connection, that most services need to be implemented by using the IPv6 connection 1, and that only a small part of services are implemented by using the IPv6 connection 2, the prefix policy module determines that the IPv6 connection 1 can be connected to a larger quantity of loads, that is, determines that the IPv6 connection 1 is a network connection with a higher load capability, and therefore uses the IPv6 prefix 1 as the IPv6 prefix of the CPE, and allocates the IPv6 prefix 1 to the STA 1 and the STA 2 by using the routing module, as shown in FIG. 6. For another example, if the prefix policy module determines that all services are connected to the IPv6 connection 1 by default, the prefix policy module determines that the IPv6 connection 1 can be connected to a larger quantity of loads, that is, determines that the IPv6 connection 1 is a network connection with a higher load capability, and the prefix policy module uses the IPv6 prefix 1 as the IPv6 prefix of the CPE, and allocates the IPv6 prefix 1 to the STA 1 and the STA 2 by using the routing module, as shown in FIG. 6. For another example, when determining that the IPv6 connection 1 can be used to concurrently process a larger quantity of loads, the prefix policy module determines that the IPv6 connection 1 is a network connection with a higher load capability, and the prefix policy module uses the IPv6 prefix 1 as the IPv6 prefix of the CPE, and allocates the IPv6 prefix 1 to the STA 1 and the STA 2 by using the routing module, as shown in FIG. 6.

The CPE generates an IPv6 address of the CPE based on the IPv6 prefix 1 and a local address of the CPE, and the STA 1 and the STA 2 respectively generate IPv6 addresses of the STA 1 and the STA 2 based on the IPv6 prefix 1 and local addresses of the STA 1 and the STA 2. For example, the IPv6 address of the STA 1 is IPv6 prefix 1+address (address, addr) 1, and the IPv6 address of the STA 2 is IPv6 prefix 1+addr 2, as shown in FIG. 6. It should be noted that, after the STA 1 and the STA 2 access the CPE, and after the STA 1 and the STA 2 send address requests to the CPE, the prefix policy module of the CPE performs the foregoing allocation of the IPv6 prefixes to the STA 1 and the STA 2. Optionally, the STA can access the CPE through a wireless local area network (wireless fidelity, Wi-Fi).

Certainly, the prefix policy module may further re-determine an IPv6 prefix based on service requirements in different time periods, to dynamically update the IPv6 prefix of the CPE and the IPv6 prefix of the STA, to ensure good service performance and improve transmission efficiency.

Because IPv6 addresses generated based on a same IPv6 prefix may be duplicate, before starting to generate the IPv6 address, the CPE or the STA needs to request, by using a neighbor solicitation (neighbor solicitation, NS), the network to perform DAD conflict detection on the IPv6 address, and determine, depending on whether an neighbor advertisement (neighbor advertisement, NA) message is received, whether the IPv6 address has a conflict (where if the NA message is received, it indicates that there is a conflict; or if no NA message is received within a period of time, it indicates that there is no conflict), to ensure that the IPv6 address can be enabled only when the IPv6 address has no conflict in a prefix domain. Specifically, for example, in a process shown in step 812 to step 818 in FIG. 8A and FIG. 8B below or in step 912 to step 918 in FIG. 9A and FIG. 9B below, the STA (for example, the STA 1) broadcasts the IPv6 address of the STA to the CPE by using an NS message, to complete DAD conflict detection on the IPv6 address of the STA 1. In this application, in addition to completing DAD conflict detection on the IPv6 address of the STA 1 in a network domain corresponding to the IPv6 address, the CPE further forwards the NS message of the STA 1 to the prefix policy module, so that the prefix policy module implements a DAD procedure for the IPv6 address of the STA 1 as a proxy. The prefix policy module replaces a prefix (for example, the IPv6 prefix 1) of the IPv6 address of the STA 1 with an IPv6 prefix (for example, the IPv6 prefix 2) of another network connection (for example, the IPv6 connection 2), constructs a corresponding new IPv6 address (for example, IPv6 prefix 2+addr 1), and then simulates the STA 1 to send an NS message corresponding to the IPv6 prefix to each network by using the modem module, to detect whether the corresponding IPv6 address has a conflict in a local network domain. If the prefix policy module receives a DAD NA reply message from a network connection, indicating that a conflict exists when the corresponding IPv6 address uses an IPv6 prefix of a network, the prefix policy module forwards the NA reply message to a corresponding STA by using the routing module, to enable the STA to regenerate a local address and then re-initiate a DAD procedure. If the STA 1 does not receive any NA message within a specified time period, the STA 1 uses the corresponding IPv6 address (IPv6 prefix 1+addr 1). In this way, it can be ensured that an IPv6 address of any STA has no conflict in any network domain, to ensure successful transmission of subsequent service data.

In this application, because the prefix policy module described above may simulate the STA to replace the IPv6 prefix of the STA with the IPv6 prefix of the network in each network domain to initiate a DAD conflict detection procedure, the corresponding network may record that an IPv6 address on a network connection corresponding to the network is reachable. Then, the network side can directly access the IPv6 address, so that the network side can access the STA corresponding to the IPv6 address.

Further, in this application, the prefix policy module of the CPE maintains a mapping relationship between the IPv6 prefix of the CPE and an IPv6 prefix of another network. When the STA performs a service, a source IP (source IP, SIP) of a service data packet sent by the STA uses the IPv6 address of the STA, and the prefix policy module of the CPE selects an appropriate network connection according to a second routing policy. For example, in a schematic diagram of service data packet forwarding shown in FIG. 7, a SIP 1 of a service data packet sent by the STA 1 is IPv6 prefix 1+addr 1. When determining that the service data packet of the STA 1 needs to be forwarded to a network corresponding to the IPv6 prefix of the CPE, the prefix policy module of the CPE directly forwards the data packet by using an IPv6 connection between the CPE and the corresponding network, that is, directly forwards the service data packet with the SIP 1 of the STA 1 being IPv6 prefix 1+addr 1 to the WAN 1 module corresponding to the network 1 in the modem module. A SIP 2 of a service data packet sent by the STA 2 is IPv6 prefix 1+addr 2. When the prefix policy module of the CPE determines that the service data packet of the STA 2 needs to be forwarded to another network (for example, the network 2), the prefix policy module replaces the IPv6 prefix 1 in the source IP address in the service data packet with the IPv6 prefix of the network that needs to be connected to, that is, the IPv6 prefix 2 of the network 2, based on the stored mapping relationship, where a SIP 3 of a generated new service data packet is IPv6 prefix 2+addr 2; and then forwards the processed service data packet (that is, the service data packet with the SIP 3 being IPv6 prefix 2+addr 2) to the destination network by using an IPv6 connection to the corresponding network, that is, forwards the service data packet with the SIP 3 of the STA 2 being IPv6 prefix 2+addr 2 to the WAN 2 module corresponding to the network 2 in the modem module, so that the service data packet is forwarded to the network 2.

When the network side accesses any IPv6 address, an access message of the network side may arrive at the prefix policy module of the CPE through the modem module. When determining that an IPv6 prefix of the accessed IPv6 address is the same as the IPv6 prefix of the CPE, the prefix policy module of the CPE directly forwards the access message to the STA corresponding to the IPv6 address by using the routing module, or when determining that an IPv6 prefix of the accessed IPv6 address is different from the IPv6 prefix of the CPE, the prefix policy module of the CPE replaces the IPv6 prefix in the destination IPv6 address in the access message with the IPv6 prefix of the CPE, and then forwards the access message to the corresponding STA by using the routing module.

Figure 7:
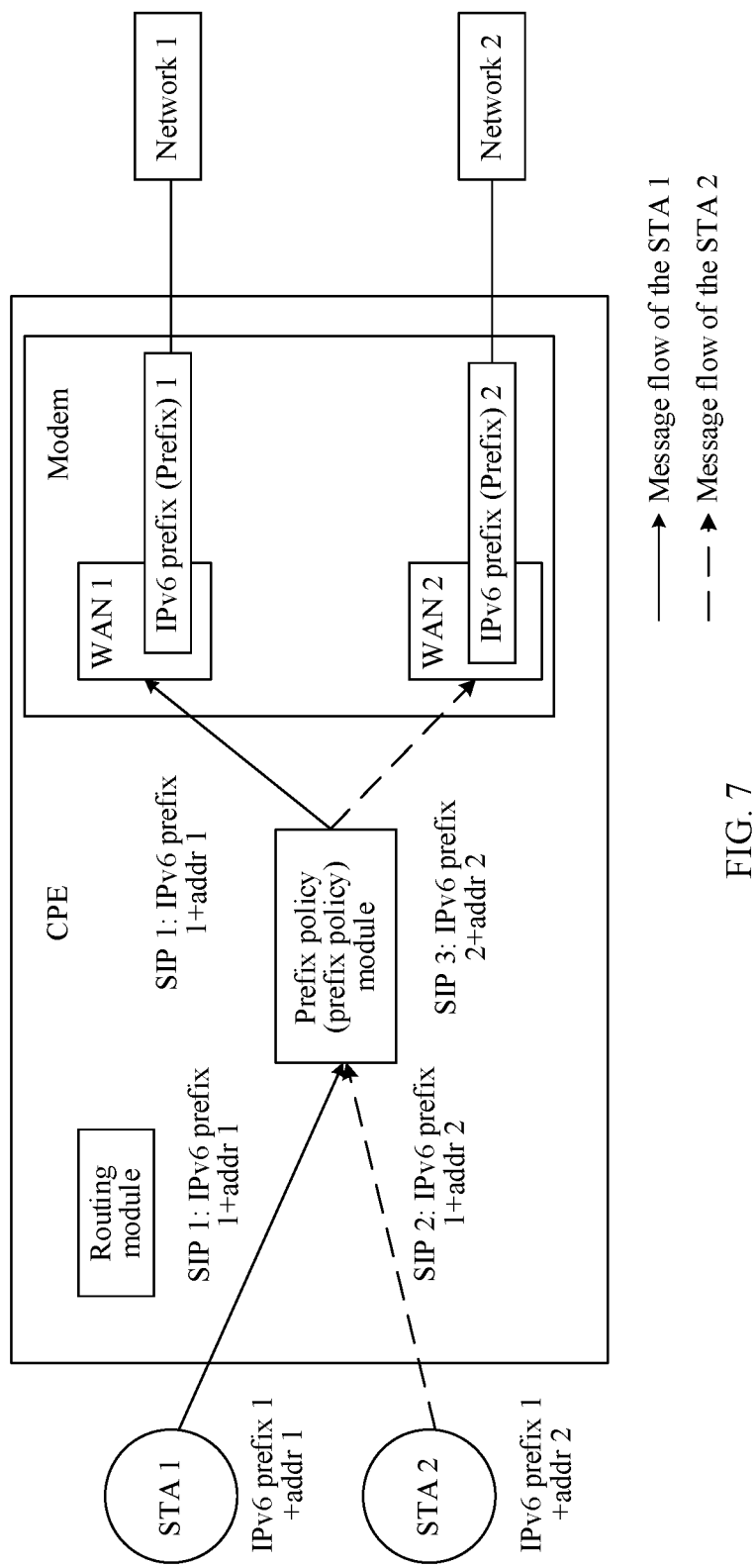
FIG. 7 is a schematic diagram of service data packet forwarding according to this application.

It should be noted that only two STAs and two networks are used as examples in FIG. 6 and FIG. 7, but this is not used as a limitation on a scenario of embodiments of this application. It should be understood that, in an actual scenario, there may be fewer or more STAs than two STAs, and there may be more networks than two networks. In addition, in FIG. 6 and FIG. 7, the STA may be replaced with another terminal device, and the CPE may be replaced with another routing device. Examples are not described one by one in this application.

Figure 8A:
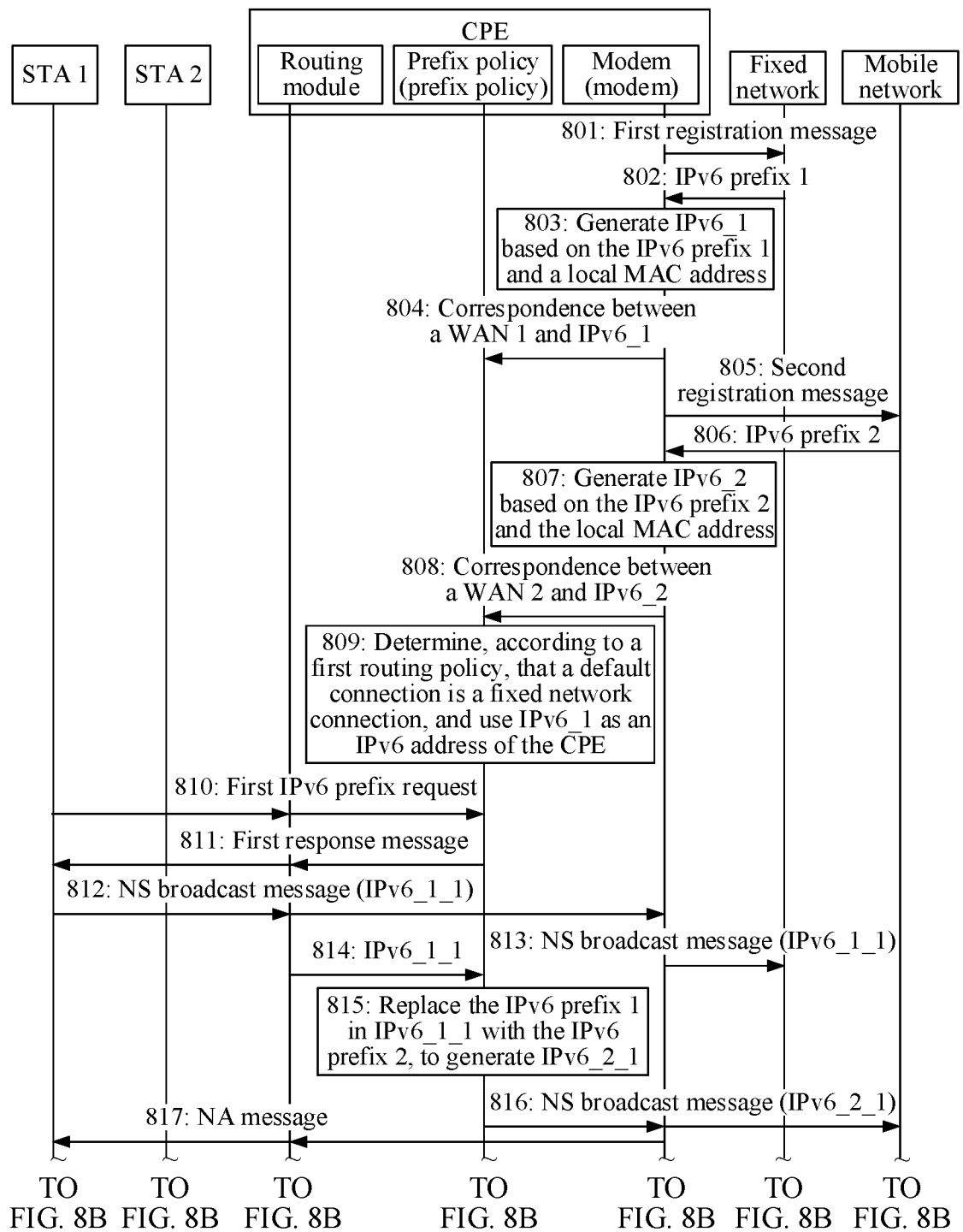
FIG. 8A and FIG. 8B are a flowchart of an example of an IPv6 address configuration method according to this application.
Figure 8B:
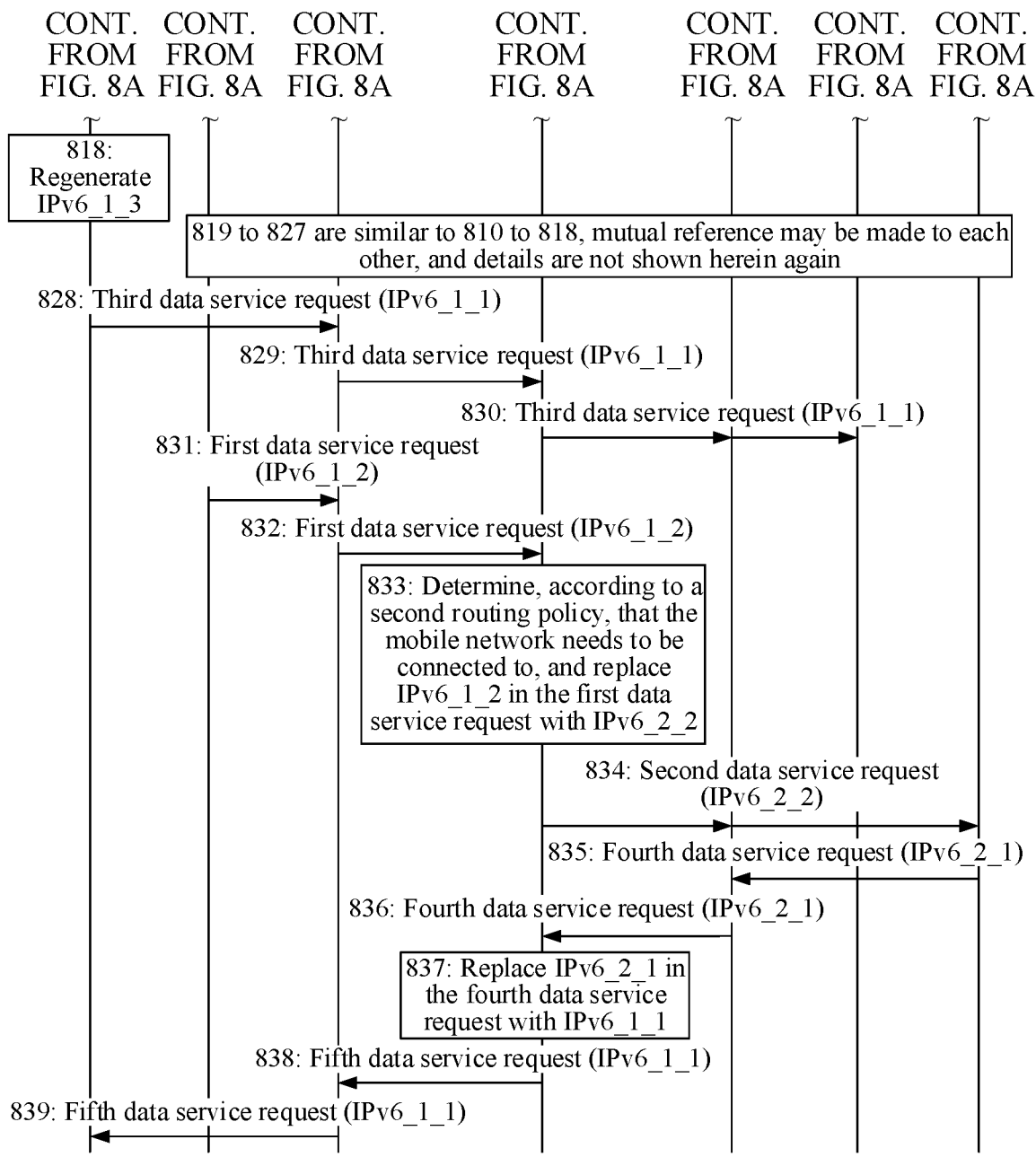

Based on the foregoing embodiment, FIG. 8A and FIG. 8B show a specific example of the IPv6 address configuration method provided in embodiments of this application. The example shown in FIG. 8A and FIG. 8B may be applied to the scenario shown in FIG. 2 or FIG. 3. In the example shown in FIG. 8A and FIG. 8B, an example in which two terminal devices are a STA 1 and a STA 2, a routing device is CPE, and two networks are a fixed network and a mobile network is used for description. Specifically, a specific procedure of this example may include the following steps.

Step 801: The CPE is powered on and registers with the fixed network. Specifically, a modem module of the CPE sends a first registration message to the fixed network.

Specifically, after the modem module completes registration with the fixed network, the modem module creates a WAN 1 internally, and connects to the fixed network by using the WAN 1, that is, the WAN 1 corresponds to a fixed network connection.

Step 802: The modem module of the CPE obtains an IPv6 prefix 1 from the fixed network.

Step 803: The modem module of the CPE generates an IPv6_1 address based on the IPv6 prefix 1 and a local MAC address of the CPE, where the IPv6_1 address is an IPv6 address of the CPE in the fixed network.

Specifically, after generating IPv6_1, the modem module broadcasts IPv6_1 to a fixed network connection domain by using an NS message, performs DAD detection on IPv6_1, determines that IPv6_1 has no conflict in a 5G 1 connection domain, and determines the IPv6_1 address as an IPv6 address of the CPE in a 5G 1 network.

In another embodiment, after the modem module broadcasts IPv6_1 to a fixed network connection domain by using an NS message, if an NA message is received, the CPE regenerates the last 64 bits of IPv6_1, and re-initiates NS message based broadcast to perform DAD detection.

Step 804: The modem module of the CPE sends a correspondence between the WAN 1 connected to the fixed network and IPv6_1 to a prefix policy module of the CPE.

Step 805: The CPE registers with the mobile network. Specifically, the modem module of the CPE sends a second registration message to the mobile network.

Similarly, after the modem module completes registration with the mobile network, the modem module creates a WAN 2 internally, and connects to a mobile network by using the WAN 2, that is, the WAN 2 corresponds to a mobile network connection.

Step 806: The modem module of the CPE obtains an IPv6 prefix 2 from the mobile network.

Step 807: The modem module of the CPE generates an IPv6_2 address based on the IPv6 prefix 2 and the local MAC address of the CPE, where the IPv6_2 address is an IPv6 address of the CPE in the mobile network.

Specifically, after generating IPv6_2, the modem module broadcasts IPv6_2 to a mobile network connection domain by using an NS message, performs DAD detection on IPv6_2, determines that IPv6_2 has no conflict in the mobile network connection domain, and determines the IPv6_2 address as the IPv6 address of the CPE in the mobile network.

In another embodiment, after the modem module broadcasts IPv6_2 to a mobile network connection domain by using an NS message, if an NA message is received, the CPE regenerates the last 64 bits of IPv6_2, and re-initiates NS message based broadcast to perform DAD detection.

Step 808: The modem module of the CPE sends a correspondence between the WAN 2 connected to the mobile network and IPv6_2 to the prefix policy module of the CPE.

Step 809: The prefix policy module determines, according to a first routing policy, that a default connection is the fixed network connection, and uses the IPv6_1 address generated by the CPE based on the IPv6 prefix 1 as an IPv6 address of the CPE.

In some embodiments, the first routing policy may be using an IPv6 prefix corresponding to a network connection with a higher load capability as a default IPv6 prefix, and the prefix policy module may use the network connection with the higher load capability as a default connection. In this application, a level of a load capability may refer to a quantity of types of load services that can be connected to the network, or a level of a load capability may refer to a quantity of load terminals that can be connected to the network, or a level of a load capability may refer to a quantity of loads that can be concurrently processed by the network, a throughput, or the like. Certainly, there may be another explanation for the level of the load capability. This is not limited in this application.

For example, the network with the higher load capability may be determined based on a correspondence between a predetermined service and a network connection or a correspondence between a STA and a network connection. For example, a game service needs to be implemented by using the fixed network, a video service needs to be implemented by using the mobile network, and a voice service needs to be implemented by using a fixed network, that is, the game service corresponds to the fixed network connection, the video service corresponds to the mobile network connection, and the voice service corresponds to the fixed network connection. In this case, the fixed network connection may correspond to N types of services such as the game service and the voice service, and the mobile network connection may correspond to M types of services such as the video service. The N types of services corresponding to the fixed network connection are more than the M types of services corresponding to the mobile network connection (that is, N is greater than M). In other words, the network connection with the higher load capability is the fixed network connection. For another example, the STA 1 corresponds to the fixed network connection, the STA 2 corresponds to the mobile network connection, and another STA (for example, a STA 3) corresponds to the fixed network connection. In this case, the fixed network connection may correspond to X STAs such as the STA 1 and the another STA, and the mobile network connection may correspond to Y STAs such as the STA 2. The X STAs corresponding to the fixed network connection are more than the Y STAs corresponding to the mobile network connection (that is, X is greater than Y). In other words, the network connection with the higher load capability is the fixed network connection.

In some embodiments, the prefix policy module may consider a network connection with a larger quantity of loads that can be concurrently processed as having a higher load capability. For example, when it is determined that a larger quantity of loads can be concurrently processed by using the fixed network connection, the fixed network connection is used as a default connection.

It should be noted that, only that the fixed network connection has a higher load capability and the fixed network connection is used as the default connection is used an example for description herein. When it is determined that the mobile network connection has a higher load capability, the mobile network is used as the default connection, and corresponding IPv6_2 is used as the IPv6 address of the CPE.

Step 810: The STA 1 sends a first IPv6 prefix request to the CPE, where the first IPv6 prefix request requests an IPv6 prefix for the STA 1.

Specifically, the first IPv6 prefix request is sent to the routing module of the CPE, and the routing module forwards the first IPv6 prefix request to the prefix policy module.

Step 811: The prefix policy module of the CPE returns the IPv6 prefix 1 to the STA 1 by using a first response message through the routing module.

Step 812: The STA 1 generates an IPv6 address IPv6_1_1 of the STA 1 based on the IPv6 prefix 1 and the local MAC address of the STA 1, and sends an NS broadcast message (that is, a first neighbor solicitation broadcast message) to the CPE, to implement DAD detection on the IPv6_1_1 address. The NS broadcast message includes IPv6_1_1.

Specifically, the NS broadcast message is sent to the routing module of the CPE, and the routing module forwards the NS broadcast message to the modem module.

Step 813: The modem module of the CPE forwards the NS broadcast message (that is, the first neighbor solicitation broadcast message) of the STA 1 to the fixed network, to complete IPv6 DAD detection on IPv6_1_1.

Step 814: The routing module of the CPE sends IPv6_1_1 of the STA 1 to the prefix policy module, and triggers the prefix policy module to complete IPv6 DAD detection in the mobile network connection domain as a proxy of the STA 1.

Step 815: The prefix policy module replaces the IPv6 prefix 1 in IPv6_1_1 with the IPv6 prefix 2, to regenerate IPv6_2_1 in the mobile network connection domain.

Step 816: The prefix policy module simulates the STA 1 to send an NS broadcast message (that is, a second neighbor solicitation broadcast message) to the mobile network by using the modem module, to perform DAD detection. The NS broadcast message (that is, the second neighbor solicitation broadcast message) includes IPv6_2_1.

It should be noted that in FIG. 8A and FIG. 8B, both the first neighbor solicitation broadcast message and the second neighbor solicitation broadcast message are shown by using NS broadcast messages, and an IPv6 address included in each NS broadcast message is shown.

Step 817: If the STA 1 receives an NA message from the CPE, indicating that the IPv6_1_1 address has a conflict in the fixed network domain and the mobile network domain, the STA 1 performs step 818.

The NA message is from the fixed network or the mobile network. Specifically, the fixed network or the mobile network sends the NA message to the modem module, and modem module forwards the NA message to the routing module, and then the routing module forwards the NA message to the STA 1. It should be noted that FIG. 8A and FIG. 8B show only a process in which the NA message is sent from the modem module to the STA 1 by using the routing module, and a process in which the NA message is sent from the fixed network or the mobile network to the modem module is not shown.

Step 818: The STA 1 regenerates the last 64 bits of IPv6_1_1, obtains a new IPv6 address IPv6_1_3 based on the IPv6 prefix 1 and the local MAC address of the STA 1, and then re-initiates an NS broadcast message to perform IPv6 DAD.

In some other embodiments, if the STA 1 does not receive the NA message within a specified time period, the STA 1 uses IPv6_1_1 as an IPv6 address of the STA 1. In the following descriptions of this embodiment, an example in which the STA 1 uses IPv6_1_1 as the IPv6 address of the STA 1 is used for description.

Step 819: The STA 2 sends a second IPv6 prefix request to the CPE, where the second IPv6 prefix request requests an IPv6 prefix for the STA 2.

Similarly, the second IPv6 prefix request is sent to the routing module of the CPE, and the routing module forwards the second IPv6 prefix request to the prefix policy module.

Step 820: The prefix policy module of the CPE returns the IPv6 prefix 1 to the STA 2 by using a second response message through the routing module.

Step 821: The STA 2 generates an IPv6 address IPv6_1_2 of the STA 2 based on the IPv6 prefix 1 and a local MAC address of the STA 2, and sends an NS broadcast message to the CPE, to implement DAD detection on the IPv6_1_2 address. The NS broadcast message includes IPv6_1_2.

Similarly, the NS broadcast message is sent to the routing module of the CPE, and the routing module forwards the NS broadcast message to the modem module.

Step 822: The modem module of the CPE forwards the NS broadcast message of the STA 2 to the fixed network, to complete IPv6 DAD detection on IPv6_1_2.

Step 823: The routing module of the CPE sends IPv6_1_2 of the STA 2 to the prefix policy module, and triggers the prefix policy module to complete IPv6 DAD detection in the mobile network domain as a proxy of the STA 2.

Step 824: The prefix policy module replaces the IPv6 prefix 1 in IPv6_1_2 with the IPv6 prefix 2, to regenerate IPv6_2_2 in the mobile network connection domain.

Step 825: The prefix policy module simulates the STA 2 to send an NS broadcast message to the mobile network by using the modem module, to perform DAD detection. The NS broadcast message includes IPv6_2_2.

Step 826: If the STA 2 receives an NA message from the CPE, indicating that the IPv6_1_2 address has a conflict in the fixed network domain and the mobile network domain, the STA 2 performs step 827.

The NA message is from the fixed network or the mobile network. Specifically, the fixed network or the mobile network sends the NA message to the modem module, the modem module forwards the NA message to the routing module, and then the routing module forwards the NA message to the STA 2.

Step 827: The STA 2 regenerates the last 64 bits of IPv6_1_2, obtains a new IPv6 address IPv6_1_4 based on the IPv6 prefix 1 and the local MAC address of the STA 2, and then re-initiates an NS broadcast message to perform IPv6 DAD.

In some other embodiments, if the STA 2 does not receive the NA message within a specified time period, the STA 2 uses IPv6_1_2 as an IPv6 address of the STA 2. In the following descriptions of this embodiment, an example in which the STA 2 uses IPv6_1_2 as the IPv6 address of the STA 2 is used for description.

It should be noted that the process of generating the IPv6 address of the STA 2 in step 819 to step 827 is similar to the process of generating the IPv6 address of the STA 1 in step 810 to step 818. Therefore, for brevity, specific processes of step 819 to step 827 are not shown one by one in FIG. 8A and FIG. 8B, and only examples are summarized in FIG. 8A and FIG. 8B. For details, refer to the examples of step 810 to step 818.

Step 828: The STA 1 sends a third data service request to the CPE, where a source IP address in the third data service request is IPv6_1_1.

The third data service request arrives at the routing module of the CPE.

Step 829: The routing module of the CPE forwards the third data service request to the prefix policy module.

Step 830: If the prefix policy module determines, according to a second routing policy, that a service corresponding to the third data service request needs to be connected to the fixed network, that is, a data packet of the service needs to be routed to the fixed network connection, the prefix policy module forwards the third data service request to the fixed network based on the fixed network connection by using the modem module.

For example, a specific method for determining, by the prefix policy module, the service corresponding to the third data service request may include: The prefix policy module may determine, based on a service type identifier of the STA 1 included in a message for requesting the IPv6 prefix by the STA 1, or based on a service type identifier included in the NS message for requesting DAD detection by the STA 1, a service type of the STA 1, that is, may determine the service corresponding to the third data service request, and then the prefix policy module determines, according to a routing policy, that the service needs to be connected to the fixed network. Alternatively, the third data service request includes a service type identifier, and the prefix policy module determines, based on the service type identifier included in the third data service request and a routing policy, that the service corresponding to the third data service request needs to be connected to the fixed network. Certainly, there may be another method. This is not limited in this application.

In an implementation, the second routing policy may be determining, based on a correspondence between a predetermined service and a network connection or a correspondence between a STA and a network connection, a network that needs to be connected to. In other words, a specific method for determining, by the prefix policy module according to the second routing policy, the network to which the service corresponding to the third data service request needs to be connected maybe: The prefix policy module may determine, based on the correspondence between a predetermined service and a network connection or the correspondence between a STA and a network connection, the network that needs to be connected to. An example in which the prefix policy module determines that the service corresponding to the third data service request needs to be connected to the fixed network is used for description herein.

Step 831: The STA 2 sends a first data service request to the CPE, where a source IP address in the first data service request is IPv6_1_2.

The first data service request arrives at the routing module of the CPE.

Step 832: The routing module of the CPE forwards the first data service request to the prefix policy module.

Step 833: The prefix policy module determines, according to the second routing policy, that a service corresponding to the first data service request needs to be connected to the mobile network, that is, a data packet of the service needs to be routed to the mobile network connection, and replaces a source IP address IPv6_1_2 in the first data service request with IPv6_2_2, to generate a new second data service request.

Specifically, a method for determining, by the prefix policy module according to the second routing policy, that the service corresponding to the first data service request needs to be connected to the mobile network is similar to the method for determining, by the prefix policy module according to the second routing policy, that the service corresponding to the third data service request needs to be connected to the fixed network. Mutual reference may be made to each other, and details are not described herein again.

Step 834: The prefix policy module forwards a data service request 3 to the mobile network based on the mobile network connection by using the modem module.

Step 835: If a cloud side needs to access the STA 1 by using the mobile network, after receiving a fourth data service request from the cloud side, the mobile network forwards the fourth data service request to the modem module of the CPE, where a destination address in the fourth data service request is IPv6_2_1.

It should be noted that FIG. 8A and FIG. 8B show only a process in which the mobile network forwards the fourth data service request after receiving the fourth data service request from the cloud side, and does not show a process in which the mobile network receives the fourth data service request from the cloud side.

Step 836: The modem module of the CPE forwards the fourth data service request to the prefix policy module.

Step 837: The prefix policy module replaces the destination address IPv6_2_1 in the fourth data service request with IPv6_1_1, to generate a fifth data service request.

Specifically, the prefix policy module may determine, based on the destination address IPv6_2_1, that the STA that needs to be accessed is the STA 1 connected to the prefix policy module, and then replace the IPv6 prefix 2 in IPv6_2_1 with the IPv6 prefix 1, to obtain the address IPv6_1_1 of the STA 1.

Step 838: The prefix policy module sends the fifth data service request to the routing module.

Step 839: The routing module addresses the STA 1 based on IPv6_1_1 in the fifth data service request, and then forwards the fifth data service request to the STA 1.

It should be noted that FIG. 8A and FIG. 8B show only a case in which the cloud side accesses the STA 1 by using the mobile network, and a principle of accessing the STA 2 by using the mobile network by the cloud side is the same as this. Details are not described herein again.

In some embodiments, if the cloud side needs to access the STA 1 by using the fixed network, the fixed network forwards a sixth data service request to the modem module of the CPE after receiving the sixth data service request from the cloud side, where a destination address in the sixth data service request is IPv6_1_1. The modem module of the CPE forwards the sixth data service request to the prefix policy module. The prefix policy module sends the sixth data service request to the routing module. The routing module addresses the STA 1 based on IPv6_1_1 in the sixth data service request, and then forwards the sixth data service request to the STA 1.

It should be noted that a principle of accessing the STA 2 by the cloud side by using the fixed network is the same as this. Details are not described herein again.

It should be noted that the mobile network in FIG. 8A and FIG. 8B may be a 5G network, an LTE network, or a future network (for example, a 6G network). This is not limited in this application.

Figure 9A:
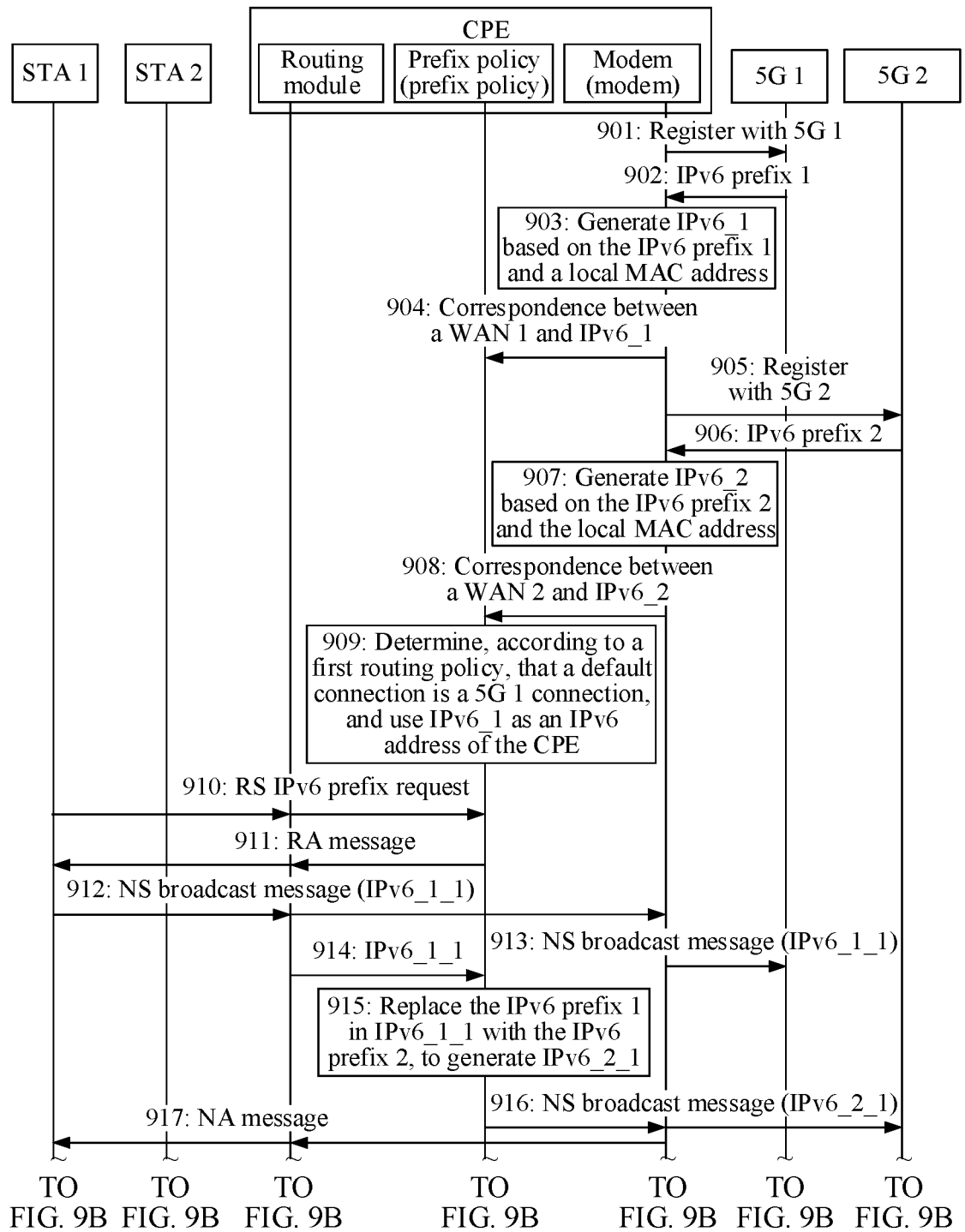
FIG. 9A and FIG. 9B are a flowchart of another example of an IPv6 address configuration method according to this application.
Figure 9B:
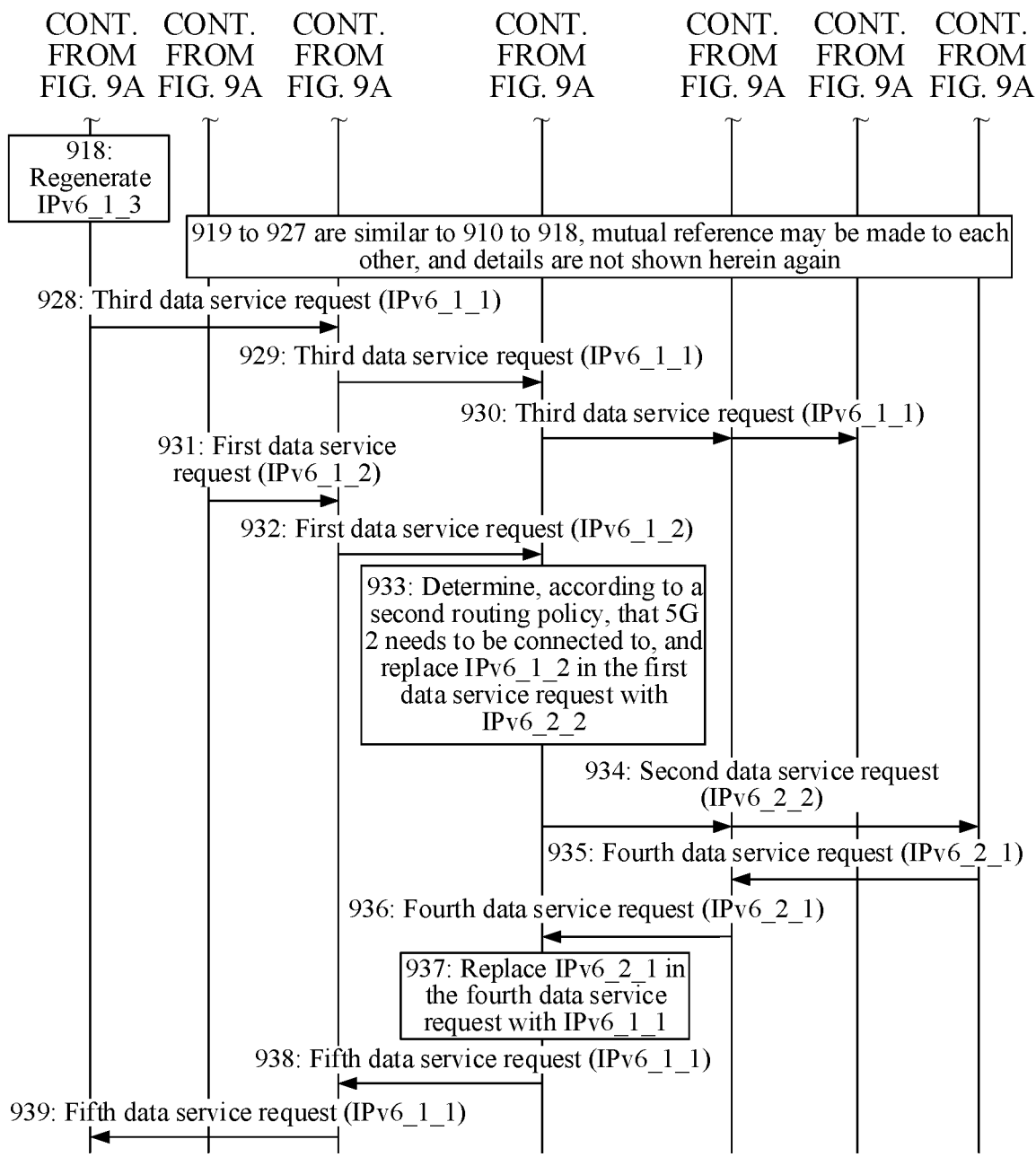

In another embodiment, FIG. 9A and FIG. 9B show another specific example of the IPv6 address configuration method provided in embodiments of this application. The example shown in FIG. 9A and FIG. 9B may be applied to the scenario shown in FIG. 5. In the example shown in FIG. 9A and FIG. 9B, an example in which two terminal devices are a STA 1 and a STA 2, a routing device is CPE, and two networks are 5G 1 and 5G 2 is used for description. Specifically, a specific procedure of this example may include the following steps.

Step 901: The CPE is powered on and registers with the 5G 1 network by using a modem module.

Specifically, the modem module of the CPE may register with the 5G 1 network by using a registration (registration) message or a protocol data unit session setup ((protocol data unit, PDU) session setup) message.

After the modem module completes registration with the 5G 1 network, the modem module creates a WAN 1 internally, and connects to 5G 1 by using the WAN 1, that is, the WAN 1 corresponds to a 5G 1 connection.

Step 902: The modem module of the CPE obtains an IPv6 prefix 1 from the 5G 1 network.

Step 903: The modem module of the CPE generates an IPv6_1 address based on the IPv6 prefix 1 and a local MAC address of the CPE, where the IPv6_1 address is an IPv6 address of the CPE in the 5G 1 network.

Specifically, after generating IPv6_1, the modem module broadcasts IPv6_1 to a 5G 1 connection domain by using a neighbor solicitation NS message, performs address conflict detection DAD detection on IPv6_1, determines that IPv6_1 has no conflict in the 5G 1 connection domain, and determines the IPv6_1 address as the IPv6 address of the CPE in the 5G 1 network.

In another embodiment, after the modem module broadcasts IPv6_1 to a 5G 1 connection domain by using an NS message, if a neighbor advertisement NA message is received, the CPE regenerates the last 64 bits of IPv6_1, and re-initiates NS message based broadcast to perform DAD detection.

Step 904: The modem module of the CPE sends a correspondence between the WAN 1 connected to 5G 1 and IPv6_1 to a prefix policy module of the CPE.

Step 905: The CPE registers with the 5G 2 network by using the modem module.

Similarly, the CPE may register with the 5G 2 network by using a registration message or a PDU session setup message.

Similarly, after the modem module completes registration with the 5G 2 network, the modem module creates a WAN 2 internally, and connects to 5G 2 by using the WAN 2, that is, the WAN 2 corresponds to a 5G 2 connection.

Step 906: The modem module of the CPE obtains an IPv6 prefix 2 from the 5G 2 network.

Step 907: The modem module of the CPE generates an IPv6_2 address based on the IPv6 prefix 2 and the local MAC address of the CPE, where the IPv6_2 address is an IPv6 address of the CPE in the 5G 2 network.

Specifically, after generating IPv6_2, the modem module broadcasts IPv6_2 to a 5G 2 connection domain by using an NS message, performs DAD detection on IPv6_2, determines that IPv6_2 has no conflict in the 5G 2 connection domain, and determines the IPv6_2 address as the IPv6 address of the CPE in the 5G 2 network.

In another embodiment, after the modem module broadcasts IPv6_2 to a 5G 2 connection domain by using an NS message, if an NA message is received, the CPE regenerates the last 64 bits of IPv6_2, and re-initiates NS message based broadcast to perform DAD detection.

Step 908: The modem module of the CPE sends a correspondence between the WAN 2 connected to 5G 2 and IPv6_2 to the prefix policy module of the CPE.

Step 909: The prefix policy module determines, according to a first routing policy, that a default connection is the 5G 1 connection, and uses the IPv6_1 address generated by the CPE based on the IPv6 prefix 1 as an IPv6 address of the CPE.

In some embodiments, the first routing policy may be using an IPv6 prefix corresponding to a network connection with a higher load capability as a default IPv6 prefix, and the prefix policy module may use a network connection with a higher load capability as a default connection. In this application, a level of a load capability may refer to a quantity of types of load services that can be connected to the network, or a level of a load capability may refer to a quantity of load terminals that can be connected to the network, or a level of a load capability may refer to a quantity of loads that can be concurrently processed by the network, a throughput, or the like. Certainly, there may be another explanation for the level of the load capability. This is not limited in this application.

For example, the network with the higher load capability may be determined based on a correspondence between a predetermined service and a network connection or a correspondence between a STA and a network connection. For example, a game service needs to be implemented by using 5G 1, a video service needs to be implemented by using 5G 2, and a voice service needs to be implemented by using 5G 1, that is, the game service corresponds to the 5G 1 connection, the video service corresponds to the 5G 2 connection, and the voice service corresponds to the 5G 1 connection. In this case, the 5G 1 connection may correspond to N types of services such as the game service and the voice service, and the 5G 2 connection may correspond to M types of services such as the video service. The N types of services corresponding to 5G 1 are more than the M types of services corresponding to 5G 2 (that is, N is greater than M). In other words, the network connection with the higher load capability is the 5G 1 connection. For another example, the STA 1 corresponds to the 5G 1 connection, the STA 2 corresponds to the 5G 2 connection, and another STA (for example, a STA 3) corresponds to the 5G 1 connection. In this case, the 5G 1 connection may correspond to X STAs such as the STA 1 and the another STA, and the 5G 2 connection may correspond to Y STAs such as the STA 2. The X STAs corresponding to the 5G 1 connection are more than the Y STAs corresponding to 5G 2 (that is, X is greater than Y). In other words, the network connection with the higher load capability is the 5G 1 connection.

In some embodiments, the prefix policy module may consider a network connection with a larger quantity of loads that can be concurrently processed as the network connection having the higher load capability. For example, when it is determined that a larger quantity of loads can be concurrently processed by using 5G 1, 5G 1 is used as a default connection.

It should be noted that, only that 5G 1 has a higher load capability and the 5G 1 connection is used as the default connection is used an example for description herein. When it is determined that 5G 2 has a higher load capability, 5G 2 is used as the default connection, and corresponding IPv6_2 is used as the IPv6 address of the CPE.

Step 910: The STA 1 sends an RS IPv6 prefix request to the CPE, where the RS IPv6 prefix request requests an IPv6 prefix for the STA 1.

Specifically, the RS IPv6 prefix request is sent to a routing module of the CPE, and the routing module forwards the RS IPv6 prefix request to the prefix policy module.

Step 911: The prefix policy module of the CPE returns the IPv6 prefix 1 to the STA 1 by using a route advertisement RA message through the routing module.

Step 912: The STA 1 generates an IPv6 address IPv6_1_1 of the STA 1 based on the IPv6 prefix 1 and the local MAC address of the STA 1, and sends an NS broadcast message (that is, a first neighbor solicitation broadcast message) to the CPE, to implement DAD detection on the IPv6_1_1 address. The NS broadcast message includes IPv6_1_1.

Specifically, the NS broadcast message is sent to the routing module of the CPE, and the routing module forwards the NS broadcast message to the modem module.

Step 913: The modem module of the CPE forwards the NS broadcast message (that is, the first neighbor solicitation broadcast message) of the STA 1 to 5G 1, to complete IPv6 DAD detection on IPv6_1_1.

Step 914: The routing module of the CPE sends IPv6_1_1 of the STA 1 to the prefix policy module, and triggers the prefix policy module to complete IPv6 DAD detection in the 5G 2 domain as a proxy of the STA 1.

Step 915: The prefix policy module replaces the IPv6 prefix 1 in IPv6_1_1 with the IPv6 prefix 2, to regenerate IPv6_2_1 in the 5G 2 connection domain.

Step 916: The prefix policy module simulates the STA 1 to send an NS broadcast message (that is, a second neighbor solicitation broadcast message) to 5G 2 by using the modem module, to perform DAD detection. The NS broadcast message (that is, the second neighbor solicitation broadcast message) includes IPv6_2_1.

It should be noted that in FIG. 9A and FIG. 9B, both the first neighbor solicitation broadcast message and the second neighbor solicitation broadcast message are shown by using NS broadcast messages, and an IPv6 address included in each NS broadcast message is shown.

Step 917: If the STA 1 receives an NA message from the CPE, indicating that the IPv6_1_1 address has a conflict in the 5G 1 domain and the 5G 2 domain, the STA 1 performs step 918.

The NA message is from the 5G 1 network or the 5G 2 network. Specifically, the 5G 1 network or the 5G 2 network sends the NA message to the modem module, the modem module forwards the NA message to the routing module, and then the routing module forwards the NA message to the STA 1. It should be noted that FIG. 9A and FIG. 9B show only a process in which the NA message is sent from the modem module to the STA 1 by using the routing module, and a process in which the NA message is sent from the 5G network to the modem module is not shown.

Step 918: The STA 1 regenerates the last 64 bits of IPv6_1_1, obtains a new IPv6 address IPv6_1_3 based on the IPv6 prefix 1 and the local MAC address of the STA 1, and then re-initiates an NS broadcast message to perform IPv6 DAD.

In some other embodiments, if the STA 1 does not receive the NA message within a specified time period, the STA 1 uses IPv6_1_1 as an IPv6 address of the STA 1. In the following descriptions of this embodiment, an example in which the STA 1 uses IPv6_1_1 as the IPv6 address of the STA 1 is used for description.

Step 919: The STA 2 sends an RS IPv6 prefix request to the CPE, where the RS IPv6 prefix request requests an IPv6 prefix for the STA 2.

Similarly, the RS IPv6 prefix request is sent to the routing module of the CPE, and the routing module forwards the RS IPv6 prefix request to the prefix policy module.

Step 920: The prefix policy module of the CPE returns the IPv6 prefix 1 to the STA 2 by using an RA message through the routing module.

Step 921: The STA 2 generates an IPv6 address IPv6_1_2 of the STA 2 based on the IPv6 prefix 1 and a local MAC address of the STA 2, and sends an NS broadcast message to the CPE, to implement DAD detection on the IPv6_1_2 address. The NS broadcast message includes IPv6_1_2.

Similarly, the NS broadcast message is sent to the routing module of the CPE, and the routing module forwards the NS broadcast message to the modem module.

Step 922: The modem module of the CPE forwards the NS broadcast message of the STA 2 to 5G 1, to complete IPv6 DAD detection on IPv6_1_2.

Step 923: The routing module of the CPE sends IPv6_1_2 of the STA 2 to the prefix policy module, and triggers the prefix policy module to complete IPv6 DAD detection in the 5G 2 domain as a proxy of the STA 2.

Step 924: The prefix policy module replaces the IPv6 prefix 1 in IPv6_1_2 with the IPv6 prefix 2, to regenerate IPv6_2_2 in the 5G 2 connection domain.

Step 925: The prefix policy module simulates the STA 2 to send an NS broadcast message to 5G 2 by using the modem module, to perform DAD detection. The NS broadcast message includes IPv6_2_2.

Step 926: If the STA 2 receives the NA message from the CPE, indicating that the IPv6_1_2 address has a conflict in the 5G 1 domain and the 5G 2 domain, the STA 2 performs step 927.

The NA message is from the 5G 1 network or the 5G 2 network. Specifically, the 5G 1 network or the 5G 2 network sends the NA message to the modem module, the modem module forwards the NA message to the routing module, and then the routing module forwards the NA message to the STA 2.

Step 927: The STA 2 regenerates the last 64 bits of IPv6_1_2, obtains a new IPv6 address IPv6_1_4 based on the IPv6 prefix 1 and the local MAC address of the STA 2, and then re-initiates an NS broadcast message to perform IPv6 DAD.

In some other embodiments, if the STA 2 does not receive the NA message within a specified time period, the STA 2 uses IPv6_1_2 as an IPv6 address of the STA 2. In the following descriptions of this embodiment, an example in which the STA 2 uses IPv6_1_2 as the IPv6 address of the STA 2 is used for description.

It should be noted that the process of generating the IPv6 address of the STA 2 in step 919 to step 927 is similar to the process of generating the IPv6 address of the STA 1 in step 910 to step 918. Therefore, for brevity, specific processes of step 919 to step 927 are not shown one by one in FIG. 9A and FIG. 9B, and only examples are summarized in FIG. 9A and FIG. 9B. For details, refer to the examples of step 910 to step 918.

Step 928: The STA 1 sends a third data service request to the CPE, where a source IP address in the third data service request is IPv6_1_1.

The third data service request arrives at the routing module of the CPE.

Step 929: The routing module of the CPE forwards the third data service request to the prefix policy module.

Step 930: If the prefix policy module determines, according to a second routing policy, that a service corresponding to the third data service request needs to be connected to 5G 1, that is, a data packet of the service needs to be routed to the 5G 1 connection, the prefix policy module forwards the third data service request to 5G 1 based on the 5G 1 connection by using the modem module.

For example, a specific method for determining, by the prefix policy module, the service corresponding to the third data service request may include: The prefix policy module may determine, based on a service type identifier of the STA 1 included in a message for requesting the IPv6 prefix by the STA 1, or based on a service type identifier included in the NS message for requesting DAD detection by the STA 1, a service type of the STA 1, that is, may determine the service corresponding to the third data service request, and then the prefix policy module determines, according to a routing policy, that the service needs to be connected to 5G 1. Alternatively, the third data service request includes a service type identifier, and the prefix policy module determines, based on the service type identifier included in the third data service request and a routing policy, that the service corresponding to the third data service request needs to be connected to 5G 1. Certainly, there may be another method. This is not limited in this application.

In an implementation, the second routing policy may be determining, based on a correspondence between a predetermined service and a network connection or a correspondence between a STA and a network connection, a network that needs to be connected to. In other words, a specific method for determining, by the prefix policy module according to the second routing policy, the network to which the service corresponding to the third data service request needs to be connected maybe: The prefix policy module may determine, based on the correspondence between a predetermined service and a network connection or the correspondence between a STA and a network connection, the network that needs to be connected to. An example in which the prefix policy module determines that the service corresponding to the third data service request needs to be connected to 5G 1 is used for description herein.

Step 931: The STA 2 sends a first data service request to the CPE, where a source IP address in the first data service request is IPv6_1_2.

The first data service request arrives at the routing module of the CPE.

Step 932: The routing module of the CPE forwards the first data service request to the prefix policy module.

Step 933: If the prefix policy module determines, according to the second routing policy, that a service corresponding to the first data service request needs to be connected to 5G 2, that is, a data packet of the service needs to be routed to a 5G 2 connection, the prefix policy module replaces the source IP address IPv6_1_2 in the first data service request with IPv6_2_2, to generate a second data service request.

Specifically, a method for determining, by the prefix policy module according to the second routing policy, that the service corresponding to the first data service request needs to be connected to 5G 2 is similar to the method for determining, by the prefix policy module according to the second routing policy, that the service corresponding to the third data service request needs to be connected to 5G 1. Mutual reference may be made to each other, and details are not described herein again.

Step 934: The prefix policy module forwards the second data service request to 5G 2 based on the 5G 2 connection by using the modem module.

Step 935: If a cloud side needs to access the STA 1 by using the 5G 2 network, after receiving a fourth data service request from the cloud side, the 5G 2 network forwards the fourth data service request to the modem module of the CPE, where a destination address in the fourth data service request is IPv6_2_1.

It should be noted that FIG. 9A and FIG. 9B show only a process in which the 5G 2 network forwards the fourth data service request after receiving the fourth data service request from the cloud side, and does not show a process in which the 5G 2 network receives the fourth data service request from the cloud side.

Step 936: The modem module of the CPE forwards the fourth data service request to the prefix policy module.

Step 937: The prefix policy module replaces the destination address IPv6_2_1 in the fourth data service request with IPv6_1_1, to generate a fifth data service request.

Specifically, the prefix policy module may determine, based on the destination address IPv6_2_1, that the STA that needs to be accessed is the STA 1 connected to the prefix policy module, and then replace the IPv6 prefix 2 in IPv6_2_1 with the IPv6 prefix 1, to obtain the address IPv6_1_1 of the STA 1.

Step 938: The prefix policy module sends the fifth data service request to the routing module.

Step 939: The routing module addresses the STA 1 based on IPv6_1_1 in the fifth data service request, and then forwards the fifth data service request to the STA 1.

It should be noted that FIG. 9A and FIG. 9B show only a case in which the cloud side accesses the STA 1 by using 5G 2, and a principle of accessing the STA 2 by using 5G 2 by the cloud side is the same as this. Details are not described herein again.

In some embodiments, if the cloud side needs to access the STA 1 by using the 5G 1 network, the 5G 1 network forwards a sixth data service request to the modem module of the CPE after receiving the sixth data service request from the cloud side, where a destination address in the sixth data service request is IPv6_1_1. The modem module of the CPE forwards the sixth data service request to the prefix policy module. The prefix policy module sends the sixth data service request to the routing module. The routing module addresses the STA 1 based on IPv6_1_1 in the sixth data service request, and then forwards the sixth data service request to the STA 1.

It should be noted that a principle of accessing the STA 2 by the cloud side by using 5G 1 is the same as this. Details are not described herein again.

It should be noted that 5G 1 in FIG. 9A and FIG. 9B may be replaced with LTE 1, and 5G 2 may be replaced with LTE 2. A procedure remains unchanged. For details, refer to the foregoing procedure. Details are not described herein again.

Figure 10:
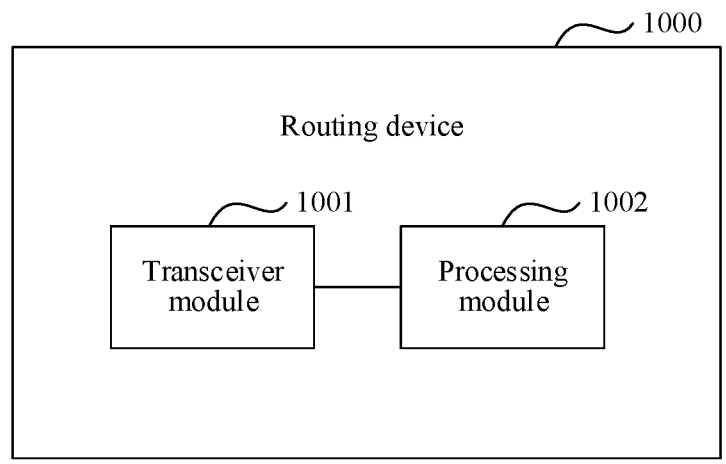
FIG. 10 is a schematic diagram of a structure of a routing device according to this application.

Based on the foregoing embodiments, an embodiment of this application provides a routing device, configured to implement the IPv6 address configuration method provided in embodiments of this application. For example, as shown in FIG. 10, the routing device 1000 may include a transceiver module 1001 and a processing module 1002. The transceiver module 1001 may implement, but not limited to, functions of the modem in FIG. 8A and FIG. 8B and FIG. 9A and FIG. 9B, and the processing module 1002 may implement, but not limited to, functions of the routing module and the prefix policy module in FIG. 8A and FIG. 8B and FIG. 9A and FIG. 9B. Specifically, when the routing device 1000 implements the IPv6 address configuration method provided in embodiments of this application, the following may be specifically included:

The transceiver module 1001 is configured to: obtain a plurality of IPv6 prefixes from a plurality of networks, where the plurality of IPv6 prefixes are in one-to-one correspondence with the plurality of networks; and send the plurality of IPv6 prefixes to the processing module 1002. The processing module 1002 is configured to: determine a first IPv6 prefix from the plurality of IPv6 prefixes according to a first routing policy, and allocate the first IPv6 prefix to a terminal device connected to the routing device, where the first IPv6 prefix corresponds to a first network; obtain a first data service request from the terminal device, where the first data service request includes a first IPv6 address of the terminal device, and the first IPv6 address is determined by the terminal device based on the first IPv6 prefix and a local address of the terminal device; determine, according to a second routing policy, that the first data service request corresponds to a second network, where the second network is any network other than the first network in the plurality of networks; and determine a second IPv6 address based on the first IPv6 address and a second IPv6 prefix corresponding to the second network, and send a second service request to the transceiver module 1001, where the second data service request includes the second IPv6 address. The transceiver module 1001 is further configured to send the second data service request to the second network.

In an example, the first routing policy may be determining an IPv6 prefix corresponding to a network with a highest load capability in the plurality of networks as the first IPv6 prefix.

In another example, the second routing policy may be determining, based on a correspondence between a predetermined service and a network connection or a correspondence between a terminal device and a network connection, a network corresponding to a data service request.

In a specific implementation, the processing module 1002 is further configured to use the first IPv6 prefix as an IPv6 prefix of the routing device.

Specifically, when determining the second IPv6 address based on the first IPv6 address and the second IPv6 prefix corresponding to the second network, the processing module 1002 is specifically configured to: replace the first IPv6 prefix in the first IPv6 address with the second IPv6 prefix, to obtain the second IPv6 address.

In an optional implementation, before the processing module 1002 obtains the first data service request from the terminal device, the processing module 1002 is further configured to: obtain a first neighbor solicitation broadcast message from the terminal device, where the first neighbor solicitation broadcast message includes the first IPv6 address; replace the first IPv6 prefix in the first IPv6 address with the second IPv6 prefix, to obtain a second neighbor solicitation broadcast message including the second IPv6 address; and send the second neighbor solicitation broadcast message to the transceiver module 1001. The transceiver module 1001 is further configured to send the second neighbor solicitation broadcast message to the second network, where the second neighbor solicitation broadcast message requests the second network to perform conflict detection on the second IPv6 address.

In an optional implementation, the processing module 1002 is further configured to send a first neighbor solicitation broadcast message to the transceiver module 1001. The transceiver module 1001 is further configured to send the first neighbor solicitation broadcast message to the first network based on the first IPv6 address, where the first neighbor solicitation broadcast message requests the first network to perform conflict detection on the first IPv6 address.

For example, the processing module 1002 is further configured to: obtain a third data service request from the terminal device, where the third data service request includes the first IPv6 address; determine that the third data service request corresponds to the first network; and send the third data service request to the transceiver module 1001. The transceiver module 1001 is further configured to forward the third data service request to the first network based on the first IPv6 address.

In an example implementation, the transceiver module 1001 is further configured to receive a fourth data service request from the second network, where the fourth data service request includes the second IPv6 address; and send the fourth data service request to the processing module 1002. The processing module 1002 is further configured to: replace the second IPv6 prefix in the second IPv6 address with the first IPv6 prefix, to generate the first IPv6 address; and send a fifth data service request to the terminal device, where the fifth data service request includes the first IPv6 address.

In an embodiment, the transceiver module 1001 is further configured to: receive a sixth data service request from the first network, where the sixth service data request includes the first IPv6 address; and send the sixth data service request to the processing module 1002. The processing module 1002 is further configured to forward the sixth data service request to the terminal device based on the first IPv6 address.

It should be noted that, in this embodiment of this application, division into the units is an example, and is merely a logical function division. During actual implementation, another division manner maybe used. Functional units in embodiments of this application maybe integrated into one processing unit, or each of the units may exist alone physically, or two or more units may be integrated into one unit. The integrated unit may be implemented in a form of hardware, or maybe implemented in a form of a software functional unit.

When the integrated unit is implemented in the form of the software functional unit and sold or used as an independent product, the integrated unit maybe stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

Figure 11:
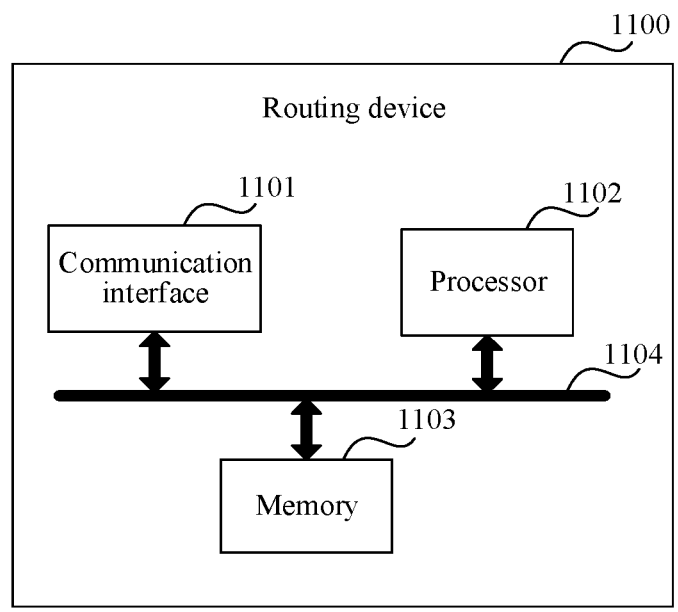
FIG. 11 is a diagram of a structure of a routing device according to this application.

Based on the foregoing embodiment, an embodiment of this application further provides a routing device, configured to implement the IPv6 address configuration method provided in embodiments of this application. For example, as shown in FIG. 11, the routing device 1100 may include a communication interface 1101 and one or more processors 1102. Optionally, the routing device 1100 may further include a memory 1103. The memory 1103 may be disposed inside the routing device 1100, or maybe disposed outside the routing device 1100. The communication interface 1101 maybe configured to receive and send a message or data, and the processor 1102 may control the communication interface 1101 to receive and send the data or the message.

Specifically, the processor 1102 may be a central processing unit (central processing unit, CPU), a network processor (network processor, NP), or a combination of the CPU and the NP. The processor 1102 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field programmable logic gate array (field programmable gate array, FPGA), generic array logic (generic array logic, GAL), or any combination thereof.

The communication interface 1101, the processor 1102, and the memory 1103 are connected to each other. Optionally, the communication interface 1101, the processor 1102, and the memory 1103 may be connected to each other by using a bus 1104. The bus 1104 may be a peripheral component interconnect (Peripheral Component Interconnect, PCI) bus, an extended industry standard architecture (Extended Industry Standard Architecture, EISA) bus, or the like. The bus may be categorized as an address bus, a data bus, a control bus, or the like. For ease of representation, only one bold line is used to represent the bus in FIG. 11, but this does not mean that there is only one bus or only one type of bus.

In an optional implementation, the memory 1103 is configured to store a program and the like. Specifically, the program may include program code, and the program code includes computer operation instructions. The memory 1103 may include a RAM, and may further include a non-volatile memory (non-volatile memory), for example, one or more disk memories. The processor 1102 executes the application program stored in the memory 1103, to enable the routing device 1100 to implement the IPv6 address configuration method shown in FIG. 8A and FIG. 8B or FIG. 9A and FIG. 9B.

Specifically, when the routing device 1100 is configured to implement the IPv6 address configuration method in embodiments of this application, for specific descriptions, refer to related descriptions in the foregoing method embodiments, and details are not described herein again.

Based on the foregoing embodiments, an embodiment of this application further provides a communication system. The communication system may include the routing device, at least one terminal device (for example, a STA), and at least one network in the foregoing embodiments.

Based on the foregoing embodiments, an embodiment of this application further provides a computer-readable storage medium. The computer-readable storage medium is configured to store a computer program. When the computer program is executed by a computer, the computer may implement any IPv6 address configuration method provided in the foregoing method embodiments.

An embodiment of this application further provides a computer program product. The computer program product is configured to store a computer program. When the computer program is executed by a computer, the computer may implement any IPv6 address configuration method provided in the foregoing method embodiments.

An embodiment of this application further provides a chip, including a processor. The processor is coupled to a memory, and is configured to invoke a program in the memory, to enable the chip to implement any IPv6 address configuration method provided in the foregoing method embodiments.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or the block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions maybe provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Clearly, a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. An Internet protocol version 6 IPv6 address configuration method, comprising:
    obtaining, by a routing device, a plurality of IPV6 prefixes from a plurality of networks, wherein the plurality of IPV6 prefixes are in one-to-one correspondence with the plurality of networks;

determining, by the routing device, a first IPV6 prefix from the plurality of IPV6 prefixes according to a first routing policy;

allocating the first IPv6 prefix to a terminal device connected to the routing device, wherein the first IPv6 prefix corresponds to a first network;

receiving, by the routing device, a first data service request from the terminal device, wherein the first data service request comprises a first IPV6 address of the terminal device, and the first IPV6 address is determined by the terminal device based on the first IPV6 prefix and a local address of the terminal device;

determining, by the routing device according to a second routing policy, that the first data service request corresponds to a second network, wherein the second network is any network other than the first network in the plurality of networks;

determining, by the routing device, a second IPv6 address based on the first IPV6 address and a second IPv6 prefix corresponding to the second network; and sending, by the routing device, a second data service request to the second network, wherein the second data service request comprises the second IPv6 address.

2. The method according to claim 1, wherein determining, by the routing device, the first IPv6 prefix from the plurality of IPv6 prefixes according to the first routing policy comprises designating an IPV6 prefix corresponding to a network with a highest load capability in the plurality of networks as the first IPv6 prefix.

3. The method according to claim 1, wherein determining, by the routing device according to the second routing policy, that the first data service request corresponds to the second network comprises selecting, based on a correspondence between a predetermined service and a network connection or a correspondence between the terminal device and the network connection, a network corresponding to a data service request.

4. The method according to claim 1, wherein the method further comprises:
using, by the routing device, the first IPV6 prefix as an IPV6 prefix of the routing device; and
determining, by the routing device, an IPv6 address of the routing device based on the first IPv6 prefix and a local address of the routing device.

5. The method according to claim 1, wherein determining, by the routing device, the second IPV6 address based on the first IPV6 address and the second IPV6 prefix corresponding to the second network comprises:
replacing, by the routing device, the first IPV6 prefix in the first IPV6 address with the second IPv6 prefix, to obtain the second IPV6 address.

6. The method according to claim 1, wherein the method further comprises:
before receiving, by the routing device, the first data service request from the terminal device:
receiving, by the routing device, a first neighbor solicitation broadcast message from the terminal device, wherein the first neighbor solicitation broadcast message comprises the first IPv6 address,
replacing, by the routing device, the first IPV6 prefix in the first IPV6 address with the second IPv6 prefix to obtain a second neighbor solicitation broadcast message comprising the second IPv6 address, and
sending, by the routing device, the second neighbor solicitation broadcast message to the second network, wherein the second neighbor solicitation broadcast message requests the second network to perform conflict detection on the second IPV6 address.

7. The method according to claim 6, wherein the method further comprises:
before receiving, by the routing device, the first data service request from the terminal device, sending, by the routing device, the first neighbor solicitation broadcast message to the first network based on the first IPV6 address, wherein the first neighbor solicitation broadcast message requests the first network to perform conflict detection on the first IPV6 address.

8. The method according to claim 1, wherein the method further comprises:
receiving, by the routing device, a third data service request from the terminal device, wherein the third data service request comprises the first IPV6 address;
determining, by the routing device according to the second routing policy, that the third data service request corresponds to the first network; and
forwarding, by the routing device, the third data service request to the first network based on the first IPV6 address.

9. The method according to claim 1, wherein the method further comprises:
receiving, by the routing device, a fourth data service request from the second network, wherein the fourth data service request comprises the second IPv6 address;
replacing, by the routing device, the second IPV6 prefix in the second IPV6 address with the first IPv6 prefix, to generate the first IPV6 address; and
sending, by the routing device, a fifth data service request to the terminal device, wherein the fifth data service request comprises the first IPV6 address.

10. The method according to claim 1, wherein the method further comprises:
receiving, by the routing device, a sixth data service request from the first network, wherein the sixth data service request comprises the first IPv6 address; and
forwarding, by the routing device, the sixth data service request to the terminal device based on the first IPV6 address.

11. A routing device, comprising a transceiver and a processor, wherein:
the transceiver is configured to:
obtain a plurality of IPV6 prefixes from a plurality of networks, wherein the plurality of IPV6 prefixes are in one-to-one correspondence with the plurality of networks,
and send the plurality of IPv6 prefixes to the processor;
the processor is configured to:
determine a first IPv6 prefix from the plurality of IPV6 prefixes according to a first routing policy,
allocate the first IPv6 prefix to a terminal device connected to the routing device, wherein the first IPv6 prefix corresponds to a first network,
obtain a first data service request from the terminal device, wherein the first data service request comprises a first IPV6 address of the terminal device, and the first IPV6 address is determined by the terminal device based on the first IPV6 prefix and a local address of the terminal device,
determine, according to a second routing policy, that the first data service request corresponds to a second network, wherein the second network is any network other than the first network in the plurality of networks, and determine a second IPV6 address based on the first IPV6 address and a second IPV6 prefix corresponding to the second network, and send a second data service request to the transceiver, wherein the second data service request comprises the second IPV6 address; and the transceiver is further configured to send the second data service request to the second network.

12. The routing device according to claim 11, wherein the processor is further configured to use the first IPV6 prefix as an IPV6 prefix of the routing device.

13. The routing device according to claim 11, wherein when determining the second IPV6 address based on the first IPV6 address and the second IPV6 prefix corresponding to the second network, the processor is configured to: replace the first IPV6 prefix in the first IPV6 address with the second IPv6 prefix, to obtain the second IPV6 address.

14. The routing device according to claim 11, wherein the processor is further configured to:
before obtaining the first data service request from the terminal device,
obtain a first neighbor solicitation broadcast message from the terminal device, wherein the first neighbor solicitation broadcast message comprises the first IPV6 address, and
replace the first IPV6 prefix in the first IPv6 address with the second IPV6 prefix, to obtain a second neighbor solicitation broadcast message comprising the second IPV6 address; and
send the second neighbor solicitation broadcast message to the transceiver; and
the transceiver is further configured to send the second neighbor solicitation broadcast message to the second network, wherein the second neighbor solicitation broadcast message requests the second network to perform conflict detection on the second IPV6 address.

15. The routing device according to claim 14, wherein:
the processor is further configured to send the first neighbor solicitation broadcast message to the transceiver; and
the transceiver is further configured to send the first neighbor solicitation broadcast message to the first network based on the first IPV6 address, wherein the first neighbor solicitation broadcast message requests the first network to perform conflict detection on the first IPv6 address.

16. The routing device according to claim 11, wherein the processor is further configured to:
obtain a third data service request from the terminal device, wherein the third data service request comprises the first IPV6 address;
determine that the third data service request corresponds to the first network; and
send the third data service request to the transceiver; and
the transceiver is further configured to forward the third data service request to the first network based on the first IPV6 address.

17. The routing device according to claim 11, wherein the transceiver is further configured to: receive a fourth data service request from the second network, wherein the fourth data service request comprises the second IPV6 address; and send the fourth data service request to the processor; and the processor is further configured to:
replace the second IPV6 prefix in the second IPV6 address with the first IPV6 prefix, to generate the first IPV6 address, and
send a fifth data service request to the terminal device, wherein the fifth data service request comprises the first IPV6 address.

18. The routing device according to claim 11, wherein the transceiver is further configured to receive a sixth data service request from the first network, wherein the sixth data service request comprises the first IPV6 address; and send the sixth data service request to the processor; and
the processor is further configured to forward the sixth data service request to the terminal device based on the first IPV6 address.

19. A routing device, comprising:
a communication interface configured to receive and send a message or data; and
a processor, coupled to a memory with a program stored thereon, wherein the program, when executed by the processor, enables the routing device to perform a method according to the following steps:
obtaining, by the routing device, a plurality of IPV6 prefixes from a plurality of networks, wherein the plurality of IPV6 prefixes are in one-to-one correspondence with the plurality of networks,
determining, by the routing device, a first IPV6 prefix from the plurality of IPV6 prefixes according to a first routing policy,
allocating the first IPV6 prefix to a terminal device connected to the routing device, wherein the first IPv6 prefix corresponds to a first network,
receiving, by the routing device, a first data service request from the terminal device, wherein the first data service request comprises a first IPV6 address of the terminal device, and the first IPV6 address is determined by the terminal device based on the first IPV6 prefix and a local address of the terminal device,
determining, by the routing device according to a second routing policy, that the first data service request corresponds to a second network, wherein the second network is any network other than the first network in the plurality of networks,
determining, by the routing device, a second IPV6 address based on the first IPV6 address and a second IPv6 prefix corresponding to the second network, and
sending, by the routing device, a second data service request to the second network, wherein the second data service request comprises the second IPV6 address.

20. The routing device according to claim 19, wherein the method further comprises:
using, by the routing device, the first IPV6 prefix as an IPV6 prefix of the routing device; and
determining, by the routing device, an IPV6 address of the routing device based on the first IPv6 prefix and a local address of the routing device.

* * * * *